US012004602B2

(12) United States Patent
Bruno

(10) Patent No.: US 12,004,602 B2
(45) Date of Patent: Jun. 11, 2024

(54) COMPONENTS WITH EMBEDDED PARTICLES AND METHODS OF MAKING SAME

(71) Applicant: Converse Inc., Boston, MA (US)

(72) Inventor: Stephen N. Bruno, Wellesley, MA (US)

(73) Assignee: Converse Inc., Boston, MA (US)

(*) Notice: Subject to any disclaimer, the term of this patent is extended or adjusted under 35 U.S.C. 154(b) by 788 days.

(21) Appl. No.: 16/715,814

(22) Filed: Dec. 16, 2019

(65) Prior Publication Data

US 2021/0177103 A1 Jun. 17, 2021

(51) Int. Cl.
*A43D 43/06* (2006.01)
*A43B 23/02* (2006.01)
*B29C 39/02* (2006.01)
*B29C 43/20* (2006.01)
*B29D 35/00* (2010.01)
*B29D 35/12* (2010.01)
*B29K 21/00* (2006.01)
*B29L 31/50* (2006.01)
*B29D 35/06* (2010.01)
*B29K 505/00* (2006.01)

(52) U.S. Cl.
CPC .......... *A43D 43/06* (2013.01); *A43B 23/0215* (2013.01); *B29C 43/20* (2013.01); *B29D 35/0054* (2013.01); *B29C 39/025* (2013.01); *B29D 35/065* (2013.01); *B29D 35/122* (2013.01); *B29K 2021/003* (2013.01); *B29K 2505/00* (2013.01); *B29L 2031/504* (2013.01)

(58) Field of Classification Search
CPC .. A43D 43/06; A43B 23/0215; A43B 1/0036; A43B 1/0072; B29D 35/0054; B29D 35/14; B29D 35/065; B29D 35/122; A43C 13/08; B29L 2031/504
See application file for complete search history.

(56) References Cited

U.S. PATENT DOCUMENTS 2,250,987 A 7/1941 Dunbar
2,481,389 A 9/1949 Campagna
(Continued)

FOREIGN PATENT DOCUMENTS

CN 2745392 Y 12/2005
CN 101564218 A 10/2009
(Continued)

OTHER PUBLICATIONS

"Champion Glitter Foxing," Keds®, keds.com.ph, accessed: May 2019, <https://www.keds.com.ph/outlet-sale/257-champion-glitter-foxing-silver-oxford.html>.
(Continued)

*Primary Examiner* — Francisco W Tschen
*Assistant Examiner* — Elisa H Vera
(74) *Attorney, Agent, or Firm* — Banner & Witcoff, Ltd.

(57) ABSTRACT

A component, for example, a shoe foxing, may have one or more regions with embedded particles and one or more regions without embedded particles. The one or more regions without embedded particles may comprise one or more outer surfaces of the component. The component may be formed by heating and pressing material sections in a mold. The component may be formed by extrusion. One or more of the material sections may lack embedded particles.

22 Claims, 16 Drawing Sheets

(56) References Cited

U.S. PATENT DOCUMENTS

| | | | | |
|---|---|---|---|---|
| 3,802,951 | A * | 4/1974 | Mitchell | A43B 13/223 |
| | | | | 428/338 |
| 3,973,284 | A | 8/1976 | Newton et al. | |
| 4,090,831 | A | 5/1978 | Hujik | |
| 4,858,337 | A | 8/1989 | Barma | |
| 4,977,691 | A * | 12/1990 | Orchard, III | A43B 5/00 |
| | | | | 36/180 |
| 6,475,609 | B1 * | 11/2002 | Whitney | B32B 7/023 |
| | | | | 428/407 |
| 6,601,319 | B1 | 8/2003 | Clements | |
| 6,689,300 | B2 | 2/2004 | Chang | |
| 7,191,549 | B2 | 3/2007 | Koo | |
| D620,695 | S | 8/2010 | McCarthy et al. | |
| D731,761 | S | 6/2015 | Carroll et al. | |
| 9,708,434 | B2 | 7/2017 | Mays et al. | |
| D809,753 | S | 2/2018 | Carroll et al. | |
| 2002/0034670 | A1 * | 3/2002 | Suenaga | H01M 8/0271 |
| | | | | 29/623.2 |
| 2004/0045192 | A1 | 3/2004 | Lin | |
| 2005/0274043 | A1 | 12/2005 | DeSaix | |
| 2006/0016098 | A1 | 1/2006 | Lu et al. | |
| 2006/0112599 | A1 * | 6/2006 | Braynock | A43B 3/0094 |
| | | | | 36/137 |
| 2008/0083486 | A1 * | 4/2008 | Yang | B29C 43/146 |
| | | | | 264/255 |
| 2008/0307670 | A1 * | 12/2008 | Duclos | A43B 9/04 |
| | | | | 36/4 |
| 2009/0007457 | A1 | 1/2009 | Skirrow | |
| 2011/0179668 | A1 | 7/2011 | Fleming et al. | |
| 2013/0055595 | A1 | 3/2013 | Brown | |
| 2015/0113830 | A1 | 4/2015 | Dillinger | |
| 2017/0020232 | A1 | 1/2017 | Bello Decurnex | |
| 2019/0037969 | A1 | 2/2019 | Busbee et al. | |
| 2019/0297996 | A1 | 10/2019 | Hensley et al. | |

FOREIGN PATENT DOCUMENTS

| | | |
|---|---|---|
| KR | 101042207 B1 | 6/2011 |
| WO | 2006075836 A1 | 7/2006 |
| WO | 2013167873 A1 | 11/2013 |
| WO | 2018175734 A1 | 9/2018 |

OTHER PUBLICATIONS

"Rainbow Glitter Authentic," Vans, vans.com, accessed: May 2019, <https://www.vans.com/shop/rainbow-glitter-rainbowglitter>.
"Jesy White Patent," Nina, ninashoes.com, accessed: May 2019, <https://www.ninashoes.com/products/jesy-white-patent>.
"Jovana Black Patent," Nina, ninashoes.com, accessed: May 2019, <https://www.ninashoes.com/products/jovana-plack-patent>.
May 27, 2021—(WO) ISR & WO—App. No. PCT/US20/064454.

* cited by examiner

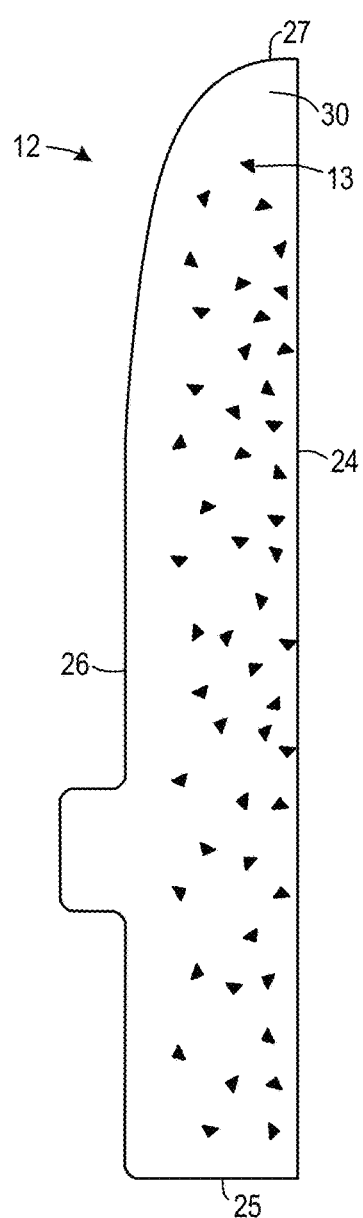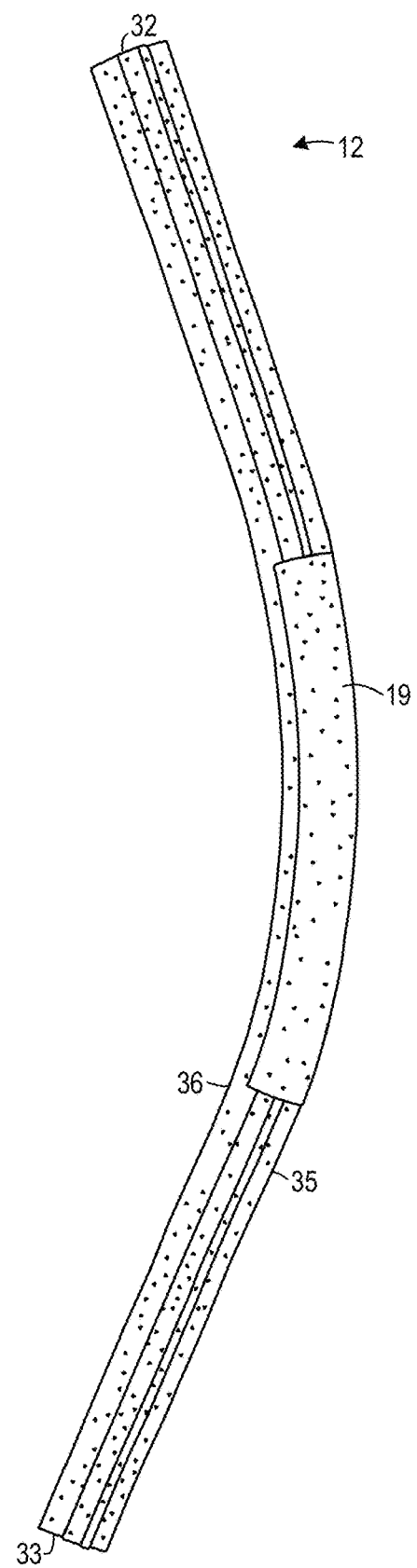
FIG. 2
FIG. 3

COMPONENTS WITH EMBEDDED PARTICLES AND METHODS OF MAKING SAME

BACKGROUND

Articles of footwear such as shoes may include components that are molded or otherwise formed from one or more types of materials. Such components may include, for example, foxing strips, outsoles and/or other sole structure components, toe caps, and numerous other components. The formed components may have functional and/or aesthetic purposes.

BRIEF DESCRIPTION OF THE DRAWINGS

Some embodiments are illustrated by way of example, and not by way of limitation, in the figures of the accompanying drawings and in which like reference numerals refer to similar elements.

FIG. 2 is an area cross-sectional view of the foxing strip shown in FIG. 1A.

FIG. 3 is a plan view of the foxing strip, shown in FIG. 1A, in a flattened form prior to attachment to other portions of the article of footwear of FIGS. 1A and 1B.

DETAILED DESCRIPTION

Figure 1A:
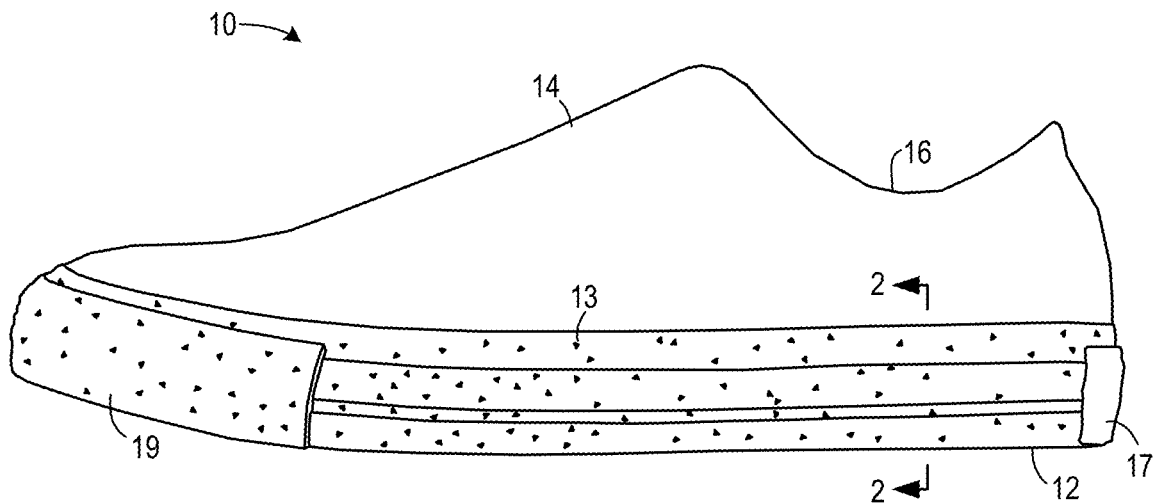
FIG. 1A is lateral side view of an example article of footwear comprising an example foxing strip.

Articles of footwear such as shoes may comprise components that are molded or otherwise formed from one or more types of materials. One example of such a component is a foxing, also known as a foxing strip. A foxing may be a strip of material that surrounds a joint between a shoe sole structure and a shoe upper. A foxing strip may be functional. For example, a foxing strip may help to secure a joint between an upper and a sole structure, may cover cavities that could collect dirt, and/or may otherwise add to the functionality of a shoe.

Because it is often one of the most visible portions of shoe, a foxing strip may also have a substantial impact on the shoe's physical appearance. A shoe designer may use a foxing strip as a pallet for achieving a particular appearance of a shoe, for example, to appeal to a particular market segment. Indeed, by changing the appearance of a foxing strip, a designer may modify an existing shoe design to create a shoe with a dramatically different appearance and/or that may appeal to a market that is different from the market for the existing shoe design.

Because of its functional and/or aesthetic significance, it may be desirable to create a foxing strip that comprises a matrix formed from one or more materials and that includes particles, embedded in that matrix, formed from one or more additional materials. As but one example of a foxing strip with embedded particles (alternatively referred to herein as 'particulate matter') to provide aesthetic features, a foxing strip matrix may comprise one or more materials that are either transparent or translucent. Particles embedded in that matrix to provide color contrast and/or other visual effects may comprise glitter, sand, colored beads or other particles, etc. As but one example of a foxing strip with embedded particles to provide functional features, a foxing strip may comprise a matrix material in which the embedded particles enhance the strength and/or durability of the foxing strip, and/or that allow use of recycled material. Such particles may comprise, for example, reinforcing strands, ground or shredded manufacturing waste (e.g., scrap from production of other components), etc.

For these and other reasons, a foxing strip with embedded particles offers numerous potential advantages. However, embedded particles have potential disadvantages. If those embedded particles protrude through an exposed outer surface of the foxing strip, and for certain types of particles and/or product use scenarios, problems may arise. Protruding particles may give the foxing strip a ragged or otherwise bad appearance. Protruding particles may also reduce the durability and/or strength of a foxing strip. For example, a protruding particle may create a tear or fissure in the outer surface of a foxing strip. That tear may then propagate and speed wear and/or cause disintegration of the foxing strip.

Forming a foxing strip with embedded particles, but without such particles near or protruding through an outer surface of that foxing strip, presents challenges. Foxing strips may be molded from elastomeric materials. If particles are simply mixed with a matrix material and placed into a mold, those particles will migrate throughout that material when the mold is closed and heated. At least a portion of those particles will migrate to or near the surface of the mold chamber. When the molded material cools and is removed from the mold, the particles that migrated toward the mold chamber surface may partially protrude, or may soon protrude as the foxing strip wears.

One or more methods described herein facilitate production of a foxing strip (or other component) having embedded particles, but with such particles displaced from an outer surface. One or more of such methods may comprise molding a foxing strip from multiple sections. One or more of those sections may comprise embedded particles. One or more others of those sections may lack embedded particles. When placing the sections into a mold, one or more of the sections without embedded particles may be positioned (e.g., adjacent a mold surface) so as to form an outermost region of the foxing strip.

FIG. 1A is a lateral side view of an example shoe 10 with an example foxing strip 12 comprising embedded particles 13. As described in more detail herein, the particles 13 may be separated from an outer surface of the foxing strip 12 by a layer of material that lacks the particles 13. This structure may, for example, help prevent the particles 13 from protruding as the strip wears. In the example of the shoe 10 and the foxing strip 12, the matrix is transparent and the particles 13 are glitter particles added for aesthetic effect. In other examples, however, a foxing strip may comprise one or more other types matrix and/or one or more other types of particles, which particles may be included for functional and/or aesthetic purposes. Methods described herein in connection with the shoe 10 and the foxing strip 12 may also or alternatively be used to produce foxing strips according to such other examples.

Figure 1B:
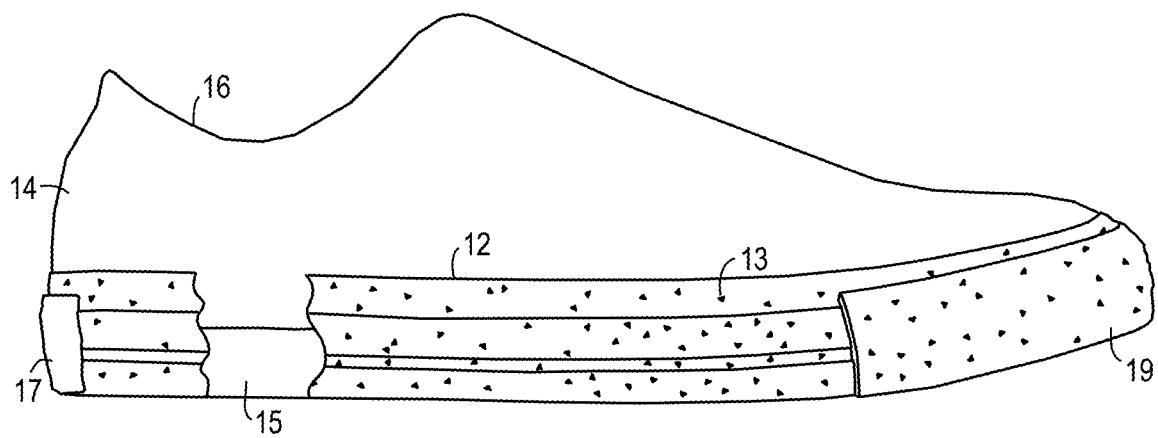
FIG. 1B is a medial side view of the article of footwear from FIG. 1A.

FIG. 1B is a medial side view of the shoe 10. In the example of FIGS. 1A and 1B, the foxing strip 12 may completely surround an outer edge of the shoe 10 and cover a connection between an upper 14 and a sole structure 15. In FIG. 1B, a portion of the foxing strip 12 is omitted to show the sole structure 15 and a bottom portion of the upper 14 that is bonded to the top of the sole structure 15. The sole structure 15 may comprise an outsole, a midsole, and/or other sole structure components, may have any of various shapes or other configurations, and may be formed from any of various materials. The upper 14 may similarly have various configurations (e.g., low ankle collar, mid- or high-top ankle collar), be formed from any of various materials, and/or comprise other features or components. The upper 14 may define an interior cavity that may receive, via an opening formed by an ankle collar 16, a foot of a wearer of the shoe 10. A tag 17 may be attached to the foxing strip 12 in the rear (e.g., for decorative and/or marking purposes and/or to cover a joint between ends of the foxing strip 12). The foxing strip 12 may include a thickened toe guard portion 19. Alternatively, a toe guard may be separately formed and attached to the foxing strip, or may be omitted.

The shoe 10 and the foxing strip 12 are provided as an example. Foxing strips with embedded particles may have different shapes, may not completely surround a shoe, may cover different regions, and/or may otherwise differ from the foxing strip 12. Similarly, foxing strips and/or other components with embedded particles may form parts of shoes and/or other articles of footwear having other configurations and/or that be intended for different uses (e.g., athletic shoes, dress shoes, casual shoes, work shoes, hiking boots, ski boots, etc.). Also or alternatively, foxing strips and/or other elements with embedded particles may be attached to or otherwise form parts of other types of apparel (e.g., pants, coats, gloves) and/or other types of wearable articles (e.g., shin guards, elbow pads, sports helmets, etc.).

FIG. 2 is an enlarged area cross-sectional view, from the location indicated in FIG. 1A, of the foxing strip 12. The surfaces of the foxing strip 12 include an interior surface 24, a bottom surface 25, an exterior surface 26, and a top surface 27. The proportions of the surfaces 24-27 and/or or of the particles 13 may not be to scale. The relative sizes of these and/or other features shown in the drawings may be exaggerated or distorted so as to more clearly show features of interest. The interior surface 24 may be bonded to regions of the sole structure 15 and the upper 14. The bottom surface 25 may face in the same direction as an outsole or other ground-contacting surface of the shoe 10. The exterior surface 26 may face away from the shoe 10 around the lower periphery of the sole structure 15 and the upper 14.

The foxing strip 12 may comprise a matrix 30 in which the particles 13 are embedded. As seen in FIG. 2, and as also described in more detail below, the particles 13 do not extend throughout the entirety of the matrix 30. Regions of the matrix 30 adjacent the bottom surface 25, the exterior surface 26, and the top surface 27 may be free of the particles 13. The particle-free regions of the matrix 30 may extend the entire length of the foxing strip 12 (e.g., around the entire periphery of the foxing strip 12 as attached to the shoe 10).

The matrix 30 may, with the exception of cavities occupied by the particles 13, be generally solid. The matrix 30 may, apart from the particles 13, be homogeneous or heterogeneous. The matrix 30 may be formed from one or more of various types of flexible polymeric materials. Those materials may include, for example, one or more elastopolymers such as artificial rubber. Some or all of the matrix 30 may be either translucent or transparent, as indicated generally in the drawing figures. This need not be the case, however, and example foxing strips and/or other articles formed using one or more of the methods described herein may comprise an opaque matrix with embedded particles, as also described in more detail below.

The particles 13 may either comprise or consist of any of various materials. Those materials, which may be different from the materials used to form the matrix 30 (or parts thereof), may be included for decorative purposes. Examples of particles that may be included for decorative purposes may include glitter. Glitter may comprise particles of plastic (e.g., polyester, polyethylene terephthalate, and/or other plastics) or other materials, that are coated and/or otherwise treated to have shiny (e.g., reflective) and/or metallic and/or colored outer surfaces. Other examples of particles that may be included for decorative and/or non-decorative purposes include, without limitation, particles of glass, particles of metals, sand, particles of mica or other minerals, particles of plastics that lack a shiny outer surface, fiber fragments, fiber bundle fragments (e.g., fragments of threads, yarns, etc.), flecks of paint, textile pieces, particles of paper, particles of recycled shoes and/or of scraps of waste material from shoe manufacturing, and/or any other particles of a size allowing embedding with a matrix of a foxing strip or other element. Embedded particles may range in size from particles barely visible to the naked eye (e.g., having a diameter or other dimensions of approximately 0.05 millimeter) to particles that extend across almost an entire thickness and/or height of a foxing strip or other element (e.g., 5 millimeters or larger). Embedded particles may be of a common (e.g., uniform) size or of different (e.g., non-uniform) sizes, may comprise more than one type of particle, and may be evenly or unevenly distributed. In one or more embodiments, particulate matter can be even smaller than 0.05 millimeters, but be present in large enough quantities as to be visible to human eyes in the aggregate, or can be superimposed over a visually contrasting background so that human eyes can visually perceive indications of their presence. In other embodiments, particulate matter can include photoluminescent materials, or crystalline or other faceted materials with one or more reflective surfaces.

FIG. 3 is a plan view of the foxing strip 12 in a flattened form and prior to attachment to other portions of the article of footwear of FIGS. 1A and 1B. The foxing strip 12 has been molded and trimmed, but has not yet been attached to the upper 14 and the sole structure 15. The foxing strip 12 may extend from a first end 32 to a second end 33 and may have arcuate (or quasi-arcuate) edges 35 and 36. The bottom edge 35 corresponds to the bottom surface 25. The top edge 36 corresponds to the top surface 27. When attached to the sole structure 15 and the lower portion of the upper 14, the foxing strip 14 may extend continuously from a medial side heel portion of the sole structure 15 and the corresponding lower portion of the upper 14, around a toe portion of the sole structure, and to a lateral side heel portion of the sole structure. A foxing strip formed using one or more of the methods described herein need not extend around an entire perimeter of a shoe, and/or a shoe may comprise multiple foxing strips formed using one or more of the methods described.

Figure 4:
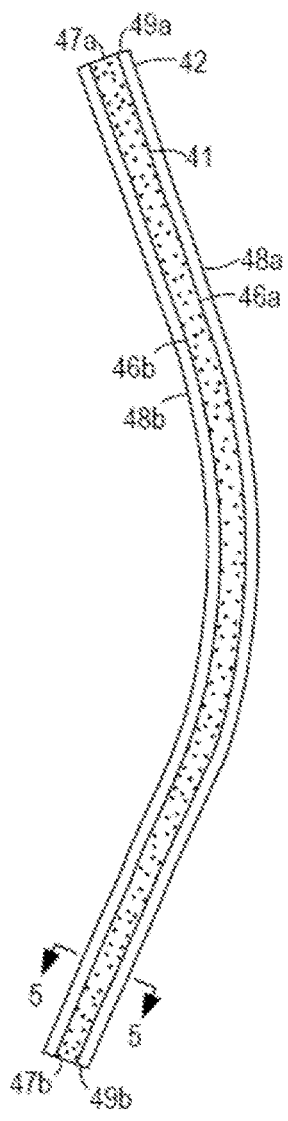
FIG. 4 is a plan view showing arrangement of elastomeric material sections used to form the foxing strip of FIG. 3.
Figure 5:
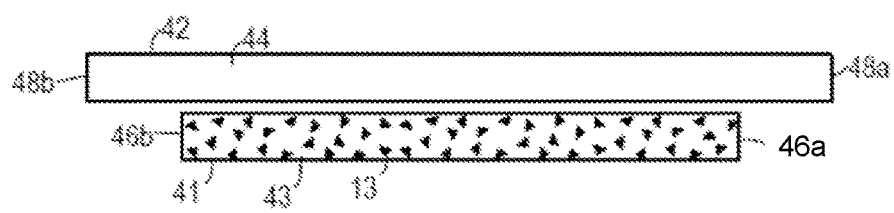
FIG. 5 is an area cross-sectional view of the elastomeric material sections of FIG. 4.

FIG. 4 is a bottom plan view showing an arrangement of two sections 41 and 42 from which the foxing strip 12 may be formed. Although the sections 41 and 42 are strips, a section may be of any size and/or shape, may be generally planar (e.g., sheets, strips, panels, etc.), may be generally non-planar, may be regular, and/or may be irregular. FIG. 5 is an area cross-sectional view of the sections 41 and 42 from the location indicated in FIG. 4. The section 41, which may have major edges 46a and 46b (a first major outer perimeter edge 46a and a second major outer perimeter edge 46b) and minor edges 47a and 47bj first minor outer perimeter edge 47a and a second minor outer perimeter edge 47b), may comprise a matrix material 43 (e.g., an elastomeric material such as uncured synthetic rubber). The section 42, which may have major edges 48a and 48b (a first major outer perimeter edge 48a and a second major outer perimeter edge 48b) and minor edges 49a and 49b (a first minor outer perimeter edge 49a and a second minor outer perimeter edge 49b), may comprise a matrix material 44 (e.g., an elastomeric material such as uncured synthetic rubber). The matrix materials 43 and 44 will form the matrix 30 of the foxing strip 12. As explained below, the section 41 may include particles 13 embedded in the matrix material 43. The section 42 may lack embedded particles 13, and may completely or substantially consist of the matrix material 44.

The matrix material 43 may be the same as the matrix material 44, or the matrix materials 43 and 44 may be different. For example, the matrix material 43 may comprise an additive that results in a first tint, and the matrix materials 44 may comprise a different additive that results in a second tint different from the first tint. As another example, one of the matrix materials 43 and 44 may be clear (e.g., transparent and untinted), and the other of the matrix materials 43 and 44 may be tinted and/or translucent or opaque. As a further example, the matrix material 43 and the matrix material 44 may have similar appearances with regard to color and/or transparence (or translucence), but may have different chemical structures that result in other physical differences. After curing, for example, the matrix material 44 may be harder and/or otherwise more durable than the matrix material 43.

The section 41 may comprise particles 13 embedded in the matrix material 43. The particles 13 may be embedded in the matrix material 43 using various methods. The method used to embed particles in a matrix material may depend on the material chosen for the matrix material. For elastomeric or other polymeric materials formed from liquid precursors, the particles 13 may be stirred into one or more of those liquid precursors during mixing. Also or alternatively, the particles 13 may be added to a solid, uncured form of the matrix material 43. If the matrix material 43 is a synthetic rubber, for example, the particles 13 may be applied to the surface of one or more blocks (e.g., lumps, sheets, and/or any other pieces of any shape) of uncured matrix material 43. The block(s) with applied particles 13 may then be calendered (e.g., pressed between rollers, which may or may not be heated) one or more times until the particles 13 are dispersed throughout the uncured matrix material 43 to a desired extent and/or concentration. After the particles 13 have been added to the uncured matrix material 43, the mixture can be formed into sheets (e.g., via a final calendering step), and the section 41 cut from that sheet. In a similar manner, the section 42 can be cut from a larger sheet of the uncured matrix material 44.

Figure 6:
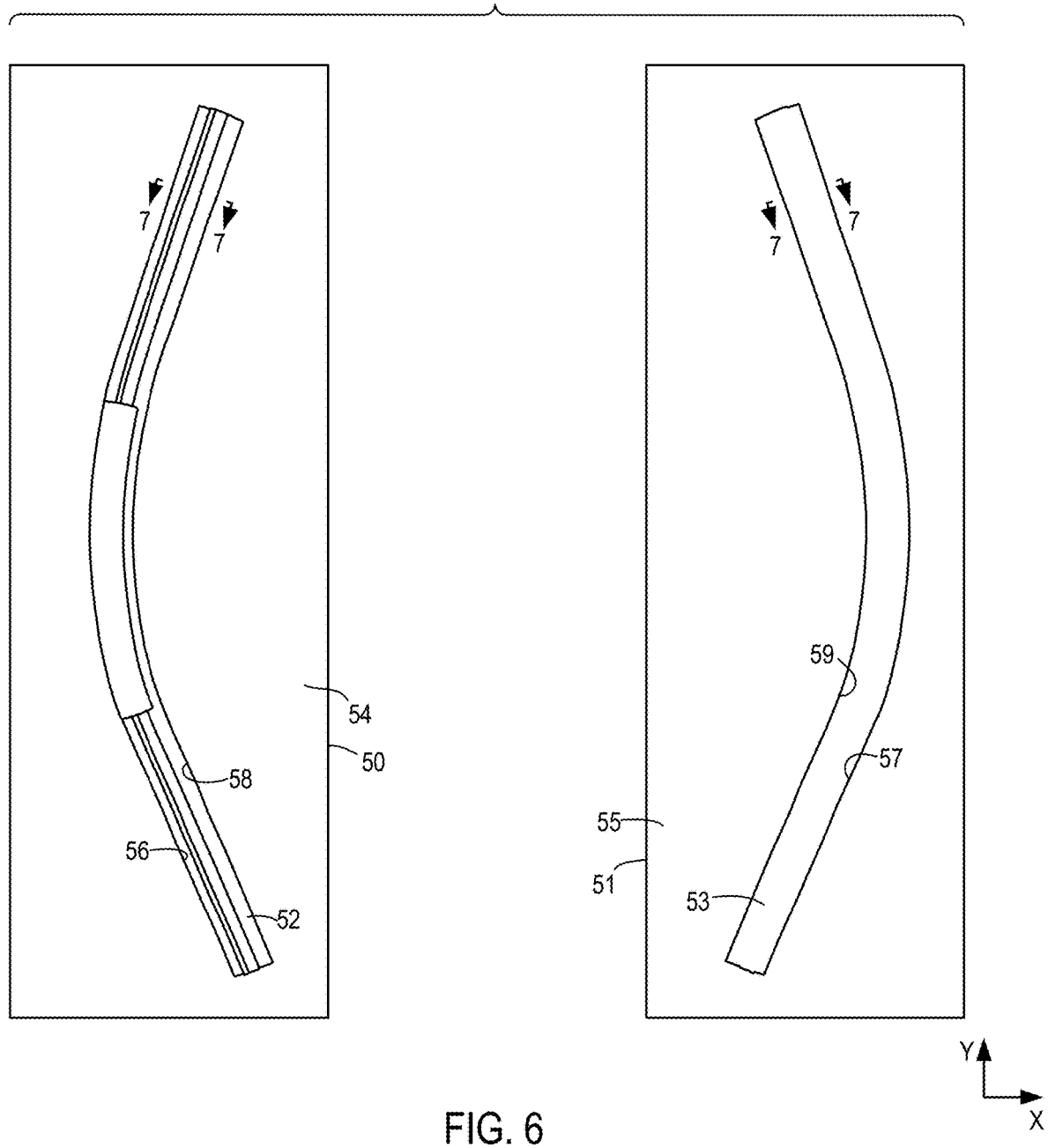
FIG. 6 shows mold elements of a mold used to form the foxing strip of FIG. 3.

FIG. 6 shows elements 50 and 51 of a mold that may be used to form the sections 41 and 42 into the foxing strip 12. The mold element 50 and the mold element 51 may be formed from steel or other material. The first mold element 50 comprises a cavity 52 formed in a first surface 54. The cavity 52 corresponds to the exterior surface 26 of the foxing strip 12, as well as to portions of the bottom surface 25 and the top surface 27 that adjoin the exterior surface 25. In particular, the surface of the cavity 52 has a contour that is opposite to a contour of the corresponding surfaces (and surface portions) of the foxing strip 12. The second mold element 51 comprises a cavity 53 formed in a second surface 55. The cavity 53 corresponds to the interior surface 24 of the foxing strip 12, as well as to portions of the bottom surface 25 and the top surface 27 that adjoin the interior surface 24. In particular, the surface of the cavity 53 has a contour that is opposite to a contour of the corresponding surfaces (and surface portions) of the foxing strip 12. Edges 56 and 57 of the mold cavities 52 and 54, respectively, correspond to the edge 35 of the foxing strip 12. Edges 58 and 59 of the mold cavities 52 and 54, respectively, correspond to the edge 36 of the foxing strip 12.

Figure 7A:
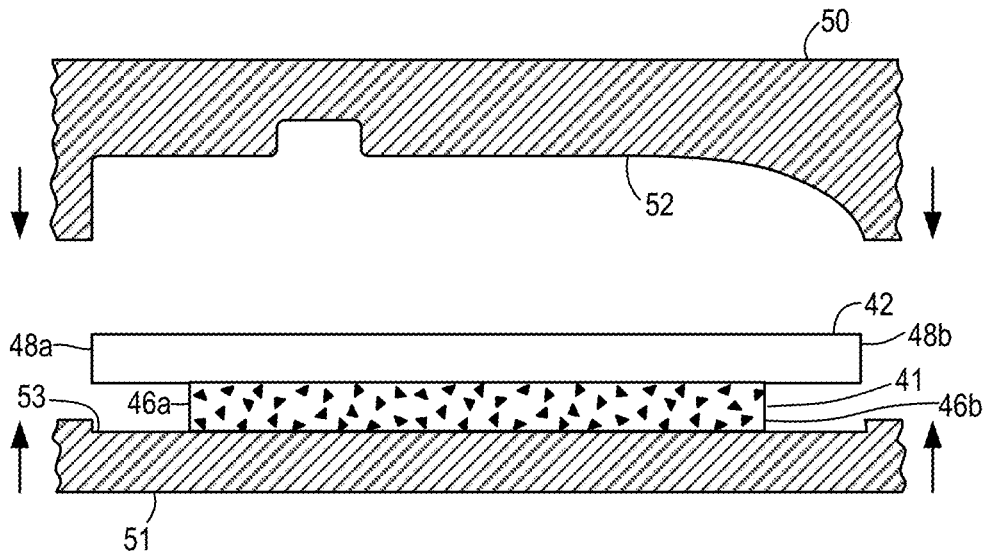
FIG. 7A is a partially schematic area cross-sectional view of the elastomeric material sections of FIG. 4 in the mold of FIG. 6.
Figure 7B:
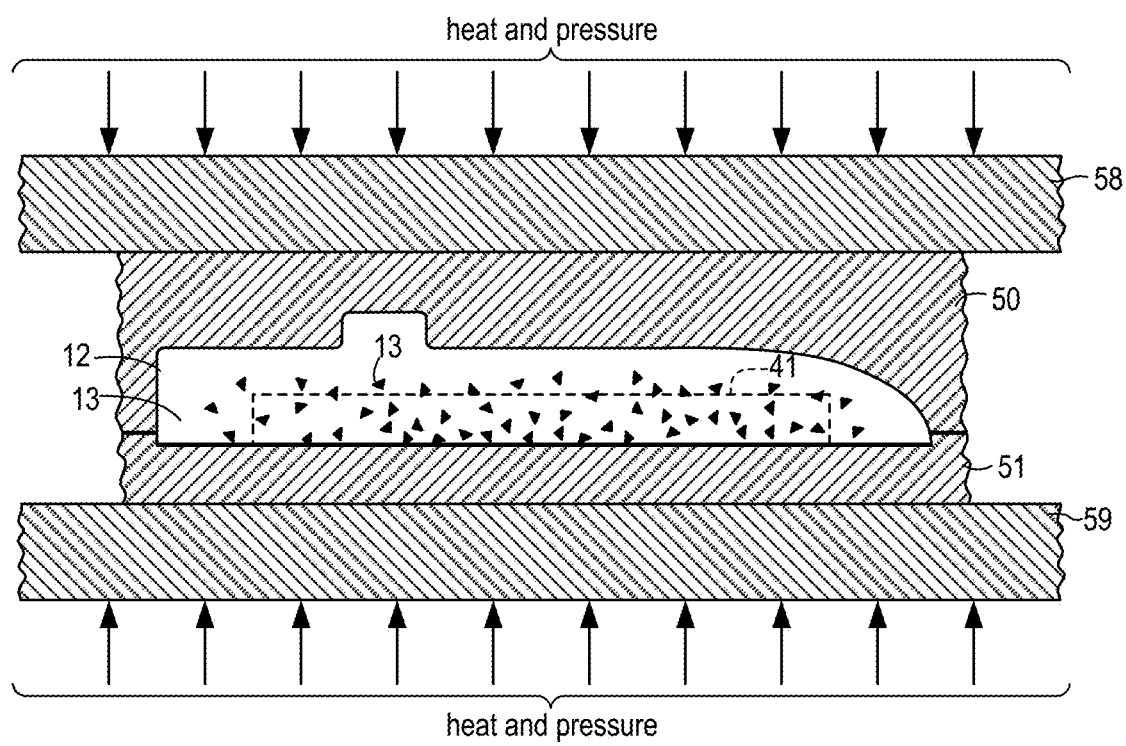
FIG. 7B is a partially schematic area cross-sectional view of the foxing strip of FIG. 3 being formed by pressing the two elastomeric material sections of FIG. 4 in the mold of FIG. 6.

FIGS. 7A and 7B are partially schematic area cross-sectional views showing formation of the foxing strip 12, using the mold elements 50 and 51, from the sections 41 and 42. In FIGS. 7A and 7B, and as a result of positioning the mold elements for molding the foxing strip 12, the orientation of the mold element 51 is rotated 180 degrees about an axis orthogonal to the X-Y plane indicated in FIG. 6. The orientation of the mold element 50 is rotated 180 degrees about that axis orthogonal to the X-Y plane, and 180 degrees about the Y axis of that X-Y plane. In FIG. 7A, the sections 41 and 42 have relative positions that are the same as or similar to those indicated in FIG. 4, but have been placed into the cavity 53 of the mold element 51. The mold elements 50 and 51 have been oriented so that the cavities 52 and 53 face each other. The section 42 overlaps, and extends past the major edges 46a and 46b of, the section 41.

As also indicated in FIG. 7A, the mold elements 50 and 51 are brought together to enclose the sections 41 and 42 in a mold cavity defined by the cavities 52 and 53. The sections 41 and 42 are positioned in the cavities 52 and 53 so that the section 42 will contact the surface of the mold cavity 52, and so that the section 41 will contact the surface of the mold cavity 53. Although FIGS. 7A and 7B show the sections 41 and 42 initially placed in the mold element 51, this is not required. For example, the sections 41 and 42 could initially be placed into the mold element 50 (e.g., by laying the section 42 in the mold cavity 52 and laying the section 41 on the section 42). Also or alternatively, the sections 41 and 42 could also be attached to one another (e.g., by tacking with small amounts of adhesive) prior to placing the attached sections 41 and 42 into one of the mold cavities.

In FIG. 7B, the mold elements 50 and 51 may be pressed between heated press platens 58 and 59. During the pressing, the matrix materials 43 and 44 soften, at least partially flow together, and fuse to form the matrix 30, with the matrix 30 filling the mold cavity and taking the shape of that cavity. During the pressing, and while the matrix materials 43 and 44 are heated, the particles 13 may migrate beyond the original volume of the section 41 shown in broken line. Because of the presence of the section 42, however, the particles 13 are prevented from migration to the surface of the cavity 52, and thus from reaching positions likely to result in protrusion through a surface of the foxing strip 12. After the heated pressing, the foxing strip 12 may be allowed to cool and may be removed from the mold elements 50 and 51. The matrix materials 43 and 44, in addition being fused to one another, may also be cured as a resulted of the heated pressing.

Figure 8:
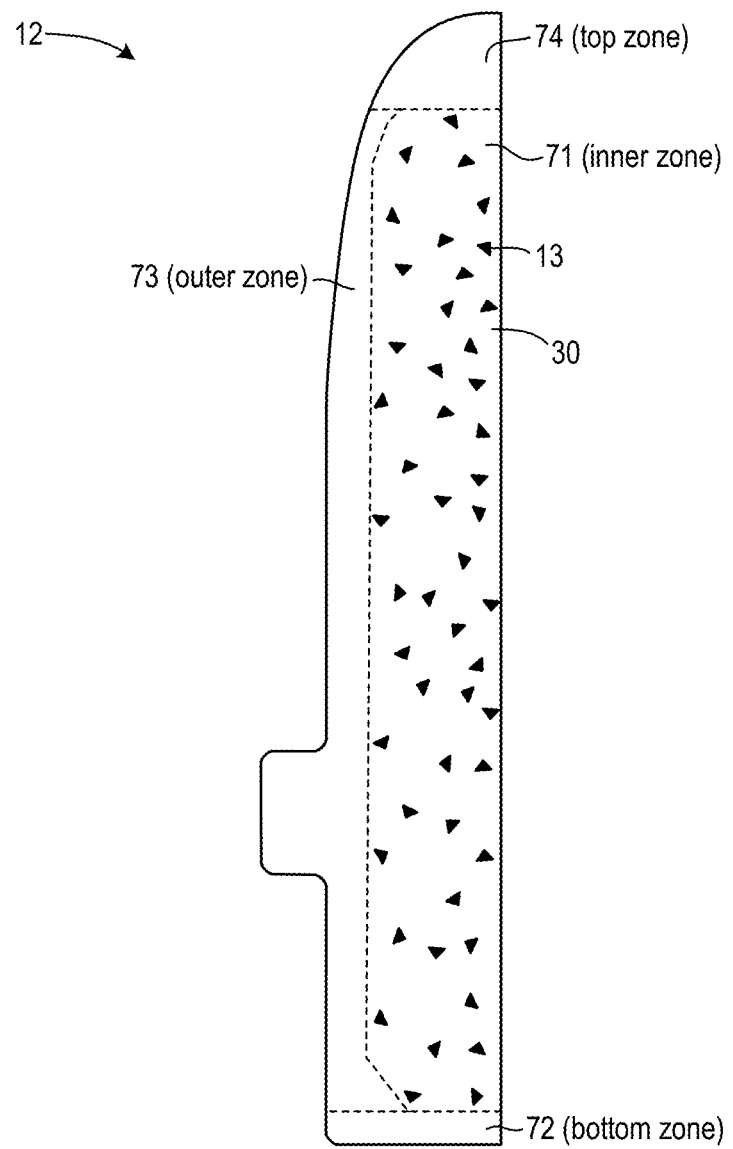
FIG. 8 is an enlarged area cross-sectional view of the foxing strip of FIG. 3.

FIG. 8 is an enlarged area cross-sectional view, from a location similar to that indicated in FIG. 1A, of the foxing strip 12. Broken lines in FIG. 8 indicate locations of various zones within the foxing strip 12. Each of the zones indicated in FIG. 8 may extend the entire length of the foxing strip 12, although the shape of the zones may vary somewhat throughout the length of the foxing strip 12. Because the matrix 30 was formed using the section 42 without the particles 13, the particles 13 from section 41 are contained in an inner zone 71. A bottom zone 72, which may extend across the entire bottom edge 35 and bottom surface 25, which may cover the bottom of the inner zone 71 (where section 42 flows over and covers the face of major outer perimeter edge 46a of section 41—see FIGS. 7A and 7B), and which may comprise a bottom surface of the foxing strip 12 that is generally aligned with an outsole of the shoe 10, is free or substantially free of the particles 13. A top zone 74, which may extend across the entire top edge 36 and top surface 27, which may cover the top of the inner zone 71 (where section 42 flows over and covers the face of major outer perimeter edge 46b of section 41—see FIGS. 7A and 7B), and which may comprise a top surface of the foxing strip 12, is also free or substantially free of the particles 13. An outer zone 73, which extends from the bottom zone 72 to the top zone 74, which covers a side of the inner zone 71, and which may comprise an exterior side surface of the foxing strip 12, is also free or substantially free of the particles 13.

In the example of the foxing strip 12, the inner zone 71 extends completely to the interior surface of the foxing strip 12. When the foxing strip 12 is attached to the upper 14 and the sole structure 15 of the shoe 10, that interior surface may be adhesively bonded to the upper 14 and the sole structure 15. Accordingly, protrusion of the particles 13 through that interior surface may not be a concern. However, a foxing strip similar to the foxing strip 12 can be formed so that the interior surface is also comprised by a zone that is free or substantially free of the particles 13.

Figure 9A:
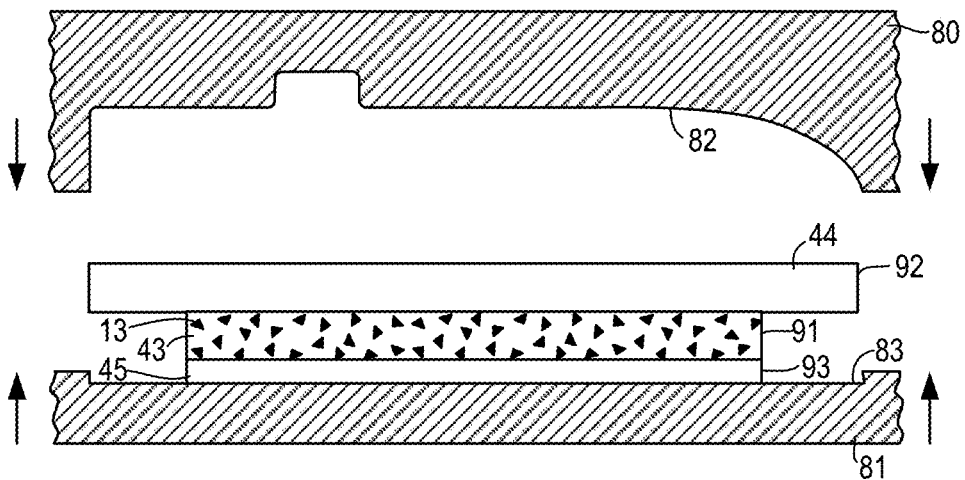
FIG. 9A is a partially schematic area cross-sectional view of elastomeric material sections in a mold similar to that of FIGS. 7A and 7B.
Figure 9B:
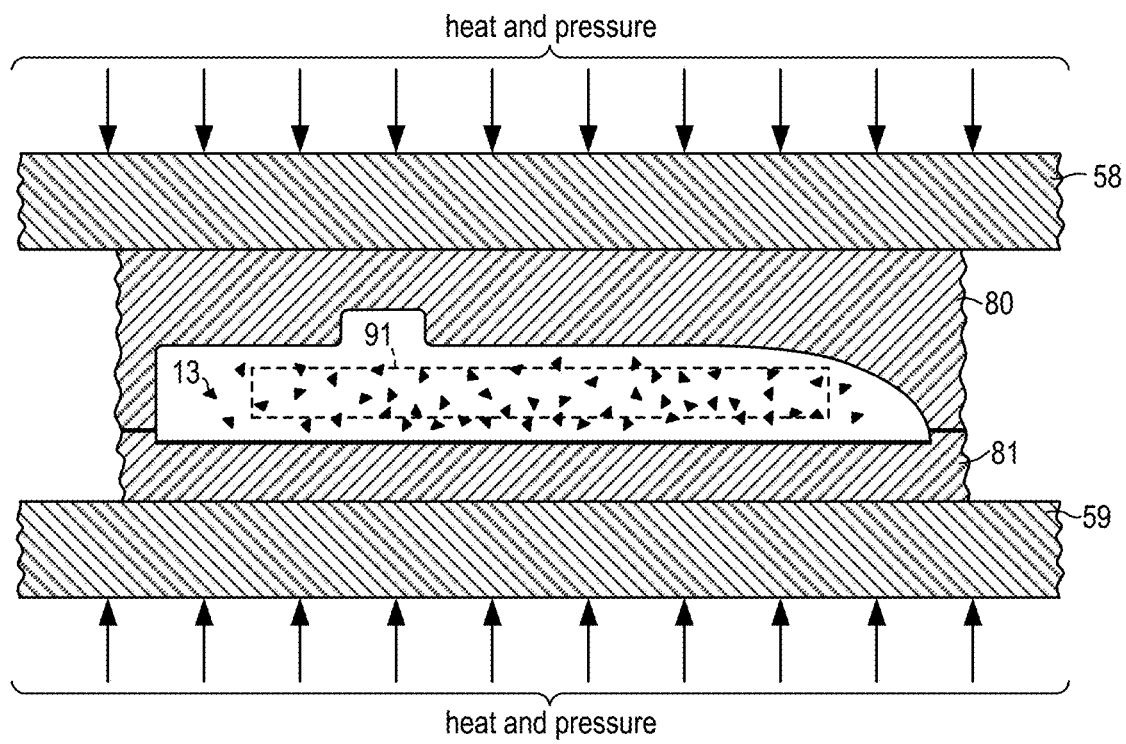
FIG. 9B is a partially schematic area cross-sectional view of a foxing strip being formed by pressing the elastomeric material sections of FIG. 9A in the mold of FIG. 9A.

FIGS. 9A and 9B are partially schematic area cross-sectional views showing formation of such a foxing strip, using mold elements 80 and 81 that may respectively be the same as or similar to the mold elements 50 and 51, from sections 93, 92, and 91. The section 91 may be similar to the section 41, and if viewed in a plan view similar to that of FIG. 4, may have a shape the same as or similar to the shape of the section 41. Similar to the section 41, the section 91 may comprise the matrix material 43 with particles 13 embedded therein. The section 92 may be similar to the section 42, and if viewed in a plan view similar to that of FIG. 4, may have a shape the same as or similar to the shape of the section 42. Similar to the section 42, the section 92 may comprise the matrix material 44 without particles 13 embedded therein. The section 93 may have a shape similar to that of the section 91 (if viewed in a plan view similar to that of FIG. 4), but may be formed from a matrix material 45, and may lack embedded particles 13. The matrix material 45 may be the same as the matrix material 43 and/or the matrix material 44, or may be different from the matrix material 43 and the matrix material 44.

In FIG. 9A, the sections 91, 92, and 93 have been placed into the cavity 83 of the mold element 81 and the mold elements 80 and 81 have been oriented so that the cavities 82 (of the mold element 80) and 83 face each other. Similar to the example of FIG. 7A, the section 92 overlaps major edges of the sections 91 and 93. As also indicated in FIG. 9A, the mold elements 80 and 81 are brought together to enclose the sections 91, 92, and 93 in the mold cavity defined by the cavities 82 and 83. The sections 91, 92, and 93 are positioned in the cavities 82 and 83 so that the section 92 will contact the surface of the mold cavity 82, so that the section 93 will contact the surface of the mold cavity 83, and so that the section 91 is separated from the surfaces of the mold cavities 82 and 83. Although FIGS. 9A and 9B show the sections 91, 92, and 93 initially placed in the mold element 81, this is not required. For example, the sections 91, 92, and 93 could initially be placed into the mold element 80. Also or alternatively, the sections 91, 92, and 93 could also be attached to one another (e.g., by tacking with small amounts of adhesive) prior to placing the attached sections 91, 92, and 93 into one of the mold cavities.

In FIG. 9B, the mold elements 80 and 81 may be pressed between the press platens 58 and 59 and heat applied. During the pressing, the matrix materials 43, 44, and 45 soften, at least partially flow together, and fuse to form a matrix of the foxing strip being formed, with that matrix filling the mold cavity and taking the shape of that cavity. During the pressing, and while the matrix materials 43, 44, and 45 are heated, the particles 13 may migrate beyond the original volume of the section 91 shown in broken line. Because of the presence of the sections 92 and 93, however, the particles 13 are prevented from migration to the surface of the cavity 82 or to the surface of the cavity 83, and thus from reaching positions likely to result in protrusion through an exterior or interior surface of the foxing strip being formed. After the heated pressing, the foxing strip may be allowed to cool and may be removed from the mold elements 80 and 81. The matrix materials 43, 44, and 45, in addition being fused to one another, may also be cured as a resulted of the heated pressing.

Figure 10:
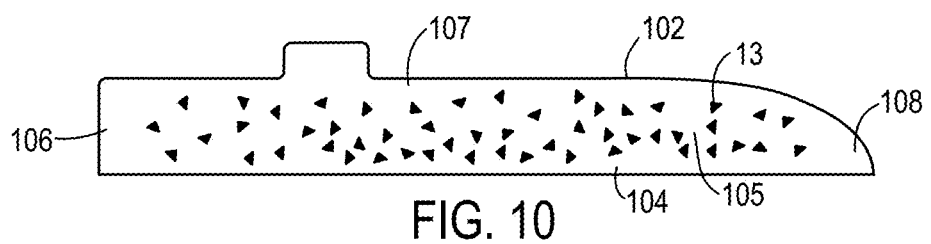
FIG. 10 is an area cross-sectional view of the foxing strip formed from the sections shown being pressed in FIG. 9B.

FIG. 10 is an area cross-sectional view, from a location similar to that indicated in FIG. 1A, of a foxing strip 102 formed from the sections 91, 92, and 93, and after removal from the mold elements 80 and 81. The foxing strip 102 may include a first inner zone 104, a second inner zone 105, a bottom zone 106, an outer zone 107, and a top zone 108. The bottom zone 106, the outer zone 107, and the top zone 108 of the foxing strip 102 may be similar to the bottom zone 72, the outer zone 73, and the top zone 74 of the foxing strip 12, and may be free or substantially free of the particles 13. The first inner zone 104 may extend from the top zone 108 to the bottom zone 106, may comprise an interior side surface of the foxing strip 102, and may be free or substantially free of the particles 13. The second inner zone 105, which may extend from the first inner zone 104 to the outer zone 107 and from the bottom zone 106 to the top zone 108, may comprise the particles 13.

Figure 11:
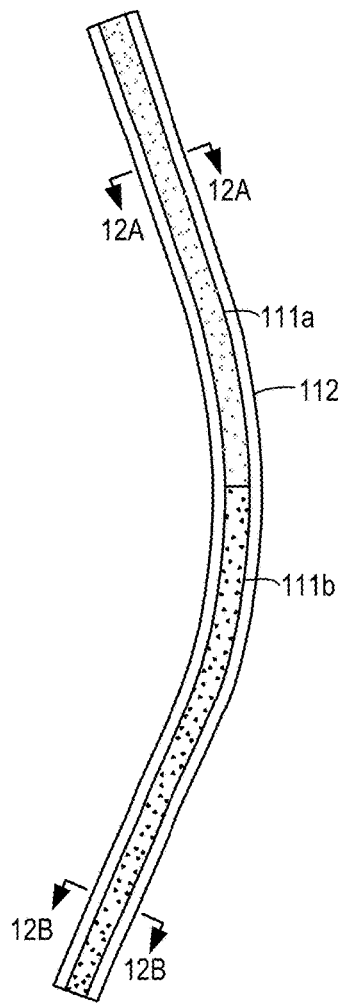
FIG. 11 is a plan view showing arrangement of elastomeric material sections used to form the foxing strip according to another example.
Figure 12A:
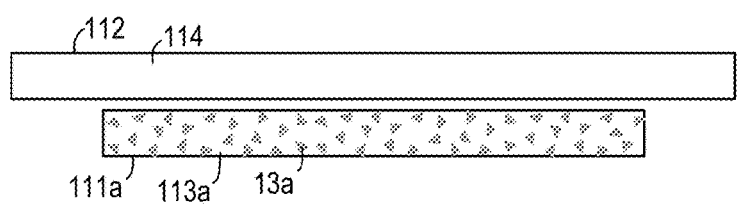
FIGS. 12A and 12B are area cross-sectional views of the elastomeric material sections of FIG. 11.
Figure 12B:
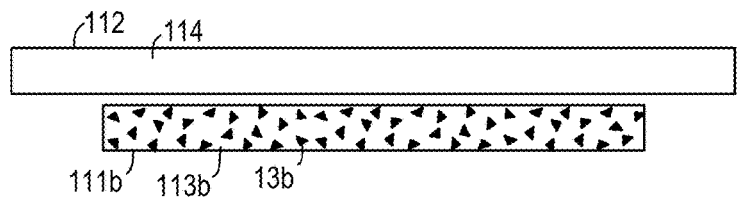

A foxing strip may also be formed, using methods similar to those described above, from multiple particle-containing sections. Each of those sections may, for example, comprise different types of particles. FIG. 11 is a bottom plan view showing arrangement of three elastomeric material sections 111a, 111b, and 112 used to form a foxing strip from multiple particle-containing sections. FIG. 12A is an area cross-sectional view, taken from a first location indicated in FIG. 11, of the sections 111a and 112. FIG. 12B is an area cross-sectional view, taken from a second location indicated in FIG. 11, of the sections 111b and 112.

The section 111a may comprise a matrix material 113a (e.g., an elastomeric material such as uncured synthetic rubber) in which a first type of particles 13a are embedded. The section 111b may comprise a matrix material 113b (e.g., an elastomeric material such as uncured synthetic rubber) in which a second type of particles 13b are embedded. The particles 13a may have functional and/or aesthetic properties that are different from the particles 13b. For example, the particles 13a may be glitter particles having a first color and the particles 13b may be glitter particles having a second color different from the first color. The section 112 may comprise a matrix material 114 (e.g., an elastomeric material such as uncured synthetic rubber), and may lack particles 13a or 13b. The matrix materials 113a, 113b, and 114 will form the matrix of a foxing strip. The matrix materials 113a, 113b, and 114 may all be the same, or some or all may be different from one another.

The sections 111a, 111b, and 112 may be placed into mold elements 50 and 51 in a manner similar to that shown for the sections 41 and 42 in FIG. 7A. The sections 111a, 111b, and 112 may then be pressed in the mold elements 50 and 51, in a manner similar to that described in connection with FIG. 7B, to form a foxing strip. The resulting foxing strip may be similar to the foxing strip 12, but with one part of the foxing strip comprising the particles 13a and another part of the foxing strip comprising the particles 13b. Optionally, the section 112 may also be replaced with two sections (e.g., one positioned adjacent to the section 111a and another positioned adjacent to the section 111b). This may be done, for example, if it is desired to have a matrix with first tint on one half of a foxing strip and a matrix with a second tint, different from the first tint, on the other half.

Figure 13A:
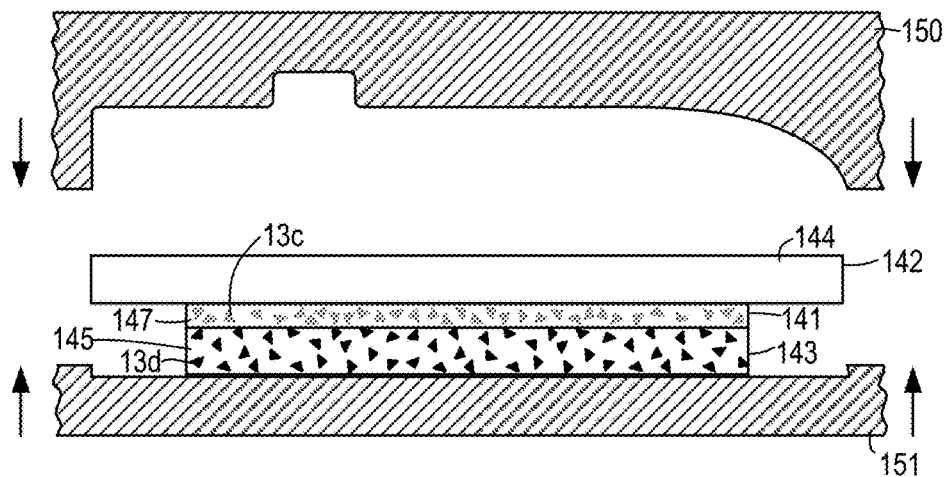
FIG. 13A is a partially schematic area cross-sectional view of another example of elastomeric material sections in a mold similar to that of FIGS. 7A and 7B.
Figure 13B:
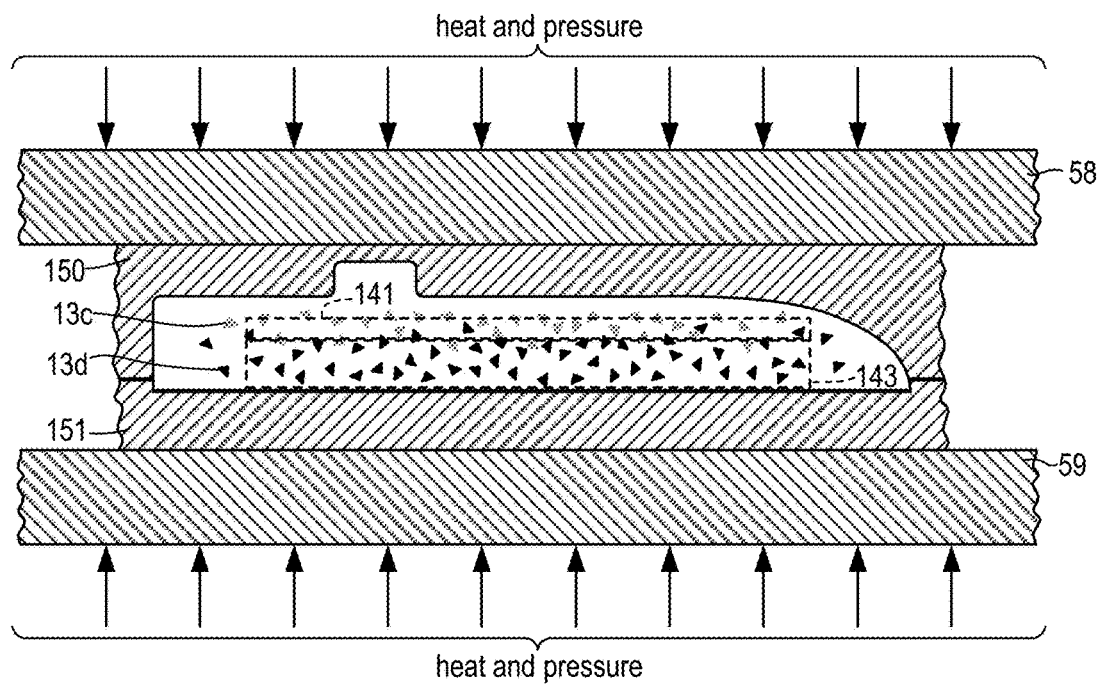
FIG. 13B is a partially schematic area cross-sectional view of a foxing strip being formed by pressing the elastomeric material sections of FIG. 13A in the mold of FIG. 13A.
Figure 14:
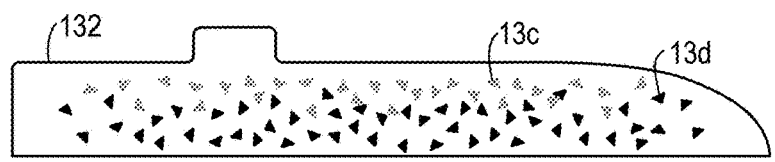
FIG. 14 is an area cross-sectional view of the foxing strip formed from the sections shown being pressed in FIG. 13B.

FIGS. 13A through 14 show an example of forming another foxing strip 132 (FIG. 14) from multiple particle-containing sections. FIGS. 13A and 13B are partially schematic area cross-sectional views showing formation of the foxing strip 132, using mold elements 150 and 151 that may respectively be the same as or similar to the mold elements 50 and 51, from sections 141, 142, and 143. The sections 141, 142, and 143 may be placed into the mold elements 150 and 151 similar to the way in which the sections 91, 92, and 93 were placed into the mold elements 80 and 81 in the example of FIG. 7A. The section 141 may, if viewed in a plan view similar to that of FIG. 4, have a shape the same as or similar to the shape of the section 41. The section 141 may comprise a matrix material 147 with particles 13c embedded therein. The section 143 may have a shape similar to that of the section 141 (if viewed in a plan view similar to that of FIG. 4), but may be formed from a matrix material 145 with particles 13d embedded therein. The particles 13c may have functional and/or aesthetic properties that are different from the particles 13d. For example, the particles 13c may be glitter particles having a first color and the particles 13d may be glitter particles having a second color different from the first color. The section 142 may be similar to the section 42, and if viewed in a plan view similar to that of FIG. 4, may have a shape the same as or similar to the shape of the section 42. The section 142 may comprise a matrix material 144 without any of the particles 13c or 13d. The matrix materials 143, 145, and 147 may comprise materials similar to those described in connection with other examples (e.g., one or more elastopolymers such as artificial rubber). The matrix materials 143, 145, and 147 may all be the same, or some or all may be different from one another. An additional section of material without particles (e.g., similar to the section 93 of FIG. 9A) may, if desired, be interposed between the section 143 and the mold element 151.

In FIG. 13B, the mold elements 150 and 151 may be pressed between the press platens 58 and 59 and heat applied. During the pressing, the matrix materials 144, 145, and 147 soften, at least partially flow together, and fuse to form a matrix of the foxing strip 132, with that matrix filling the mold cavity and taking the shape of that cavity. During the pressing, and while the matrix materials 144, 145, and 147 are heated, the particles 13c and 13d may migrate beyond the original volumes of the sections 141 and 143 shown in broken lines. After the heated pressing, the foxing strip 132 may be allowed to cool and may be removed from the mold elements 150 and 151. FIG. 14 is an area cross-sectional view, from a location similar to that indicated in FIG. 1A, of the foxing strip 132. As shown in FIG. 14, the particles 13d may form a background for the particles 13c.

Figure 15A:
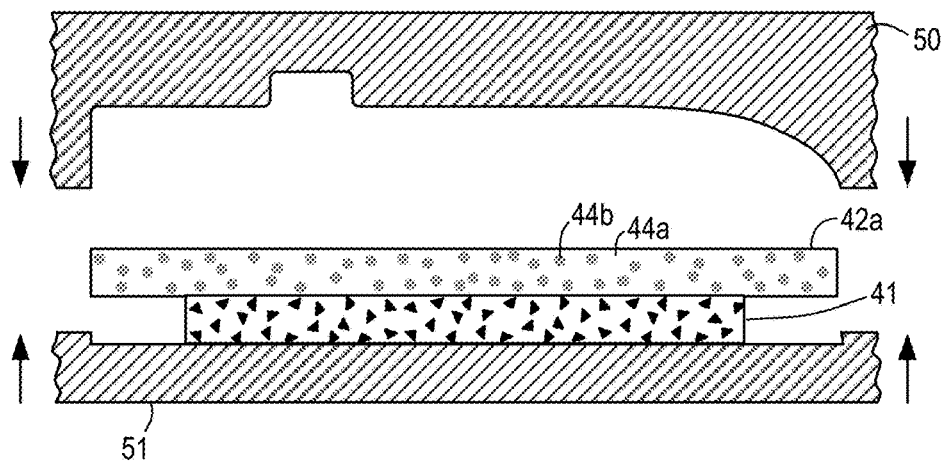
FIG. 15A is a partially schematic area cross-sectional view of a further example of elastomeric material sections in a mold similar to that of FIGS. 7A and 7B.

A material section forming an outer, bottom, and/or top portion of a foxing strip (e.g., the materials 44, 114, 144) need not be homogeneous. For example, and as shown in FIG. 15A, the section 42 from the example of FIG. 7A has been replaced with a section 42a. The section 42a, which may have a shape similar to that of section 42, is formed from a matrix material 44a having embedded particles of a different material 44b. The material 44a may, for example, be a transparent material (e.g., an elastopolymer such as artificial rubber) that is clear or that has a first tint. The material 44b may be a different material (e.g., another elastopolymer, such as another artificial rubber) that has a different color or tint than the material 44a. However, other properties of the material 44b may be similar to properties of the material 44a, and migration of the material 44b to the outer surface of a foxing strip may be acceptable (and/or desired).

Figure 15B:
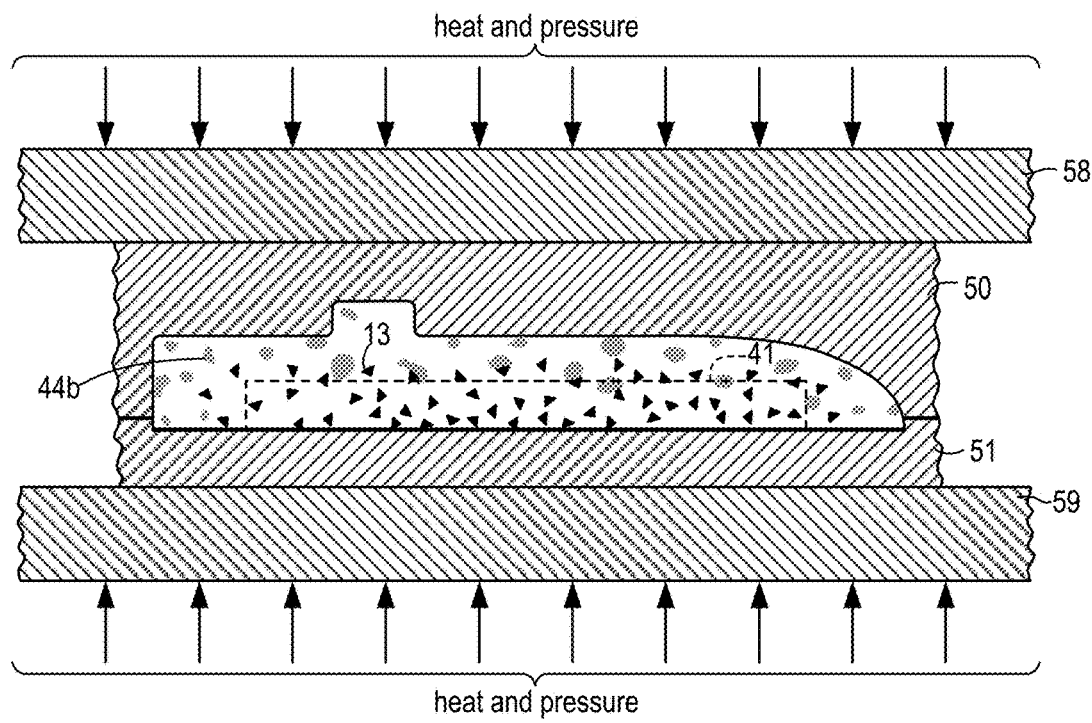
FIG. 15B is a partially schematic area cross-sectional view of a foxing strip being formed by pressing the elastomeric material sections of FIG. 15A in the mold of FIG. 15A.
Figure 16:
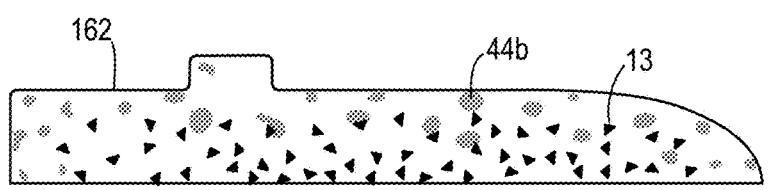
FIG. 16 is an area cross-sectional view of the foxing strip formed from the sections shown being pressed in FIG. 15B.

FIG. 15B shows the sections 41 and 42a being pressed and heated in a manner similar to that described in connection with FIG. 7B. During the heated pressing, the particles of the material 44b may deform and migrate so as to create a visual effect different from that of a material with a single tint. After the heated pressing, the foxing strip may be allowed to cool and may be removed from the mold elements 50 and 51. FIG. 16 is an area cross-sectional view, from a location similar to that indicated in FIG. 1A, of a foxing strip 162 formed using the pressing shown in FIG. 15B.

Multiple particle-containing sections could be used in additional and/or alternative combinations. For example, and so as to obtain a different concentration of particles within different regions of a foxing strip, a first section comprising a first concentration of embedded particles could be positioned form one part of a foxing strip, and a second section comprising a second concentration of embedded particles positioned to form another part of that foxing strip. The first and second concentrations may be different.

Figure 17:
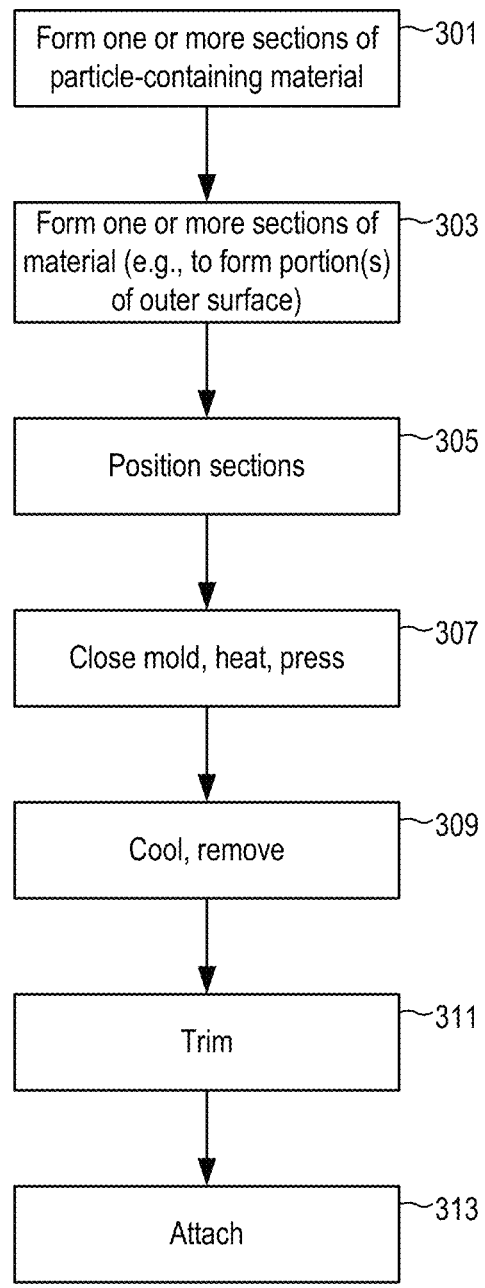
FIG. 17 is a flowchart showing steps of an example method for fabricating a foxing strip and/or other component(s) and affixing the component(s) to a shoe.

FIG. 17 is a flowchart showing steps of an example method for fabricating a component (e.g., a foxing strip and/or other component (e.g., an ankle patch and/or label such as are described below)) and affixing that component to a shoe. The order of some steps may be rearranged. Some steps may be omitted and/or other steps may be added. In step 301, one or more sections of a particle-containing material (e.g., one or more of the sections 41, 91, 111a, 111b, 141, 143, or 432 (FIG. 19)) may be formed. Step 301 may comprise one or more mixing steps to combine one or more types of particles with one or more types of matrix materials. Those mixing steps may, for example, comprise applying particles to blocks of uncured matrix material and performing one or more calendering steps. Step 301 may further comprise one or more steps of cutting sections from a larger sheet or other shape of calendered matrix material mixed with particles. In step 303, one or more sections (e.g., one or more of the sections 42, 92, 93, 142, 42a, or 431 (FIG. 19)) may be formed. The section(s) formed in step 303 may lack particles of the type mixed with a matrix material in step 301, and/or may otherwise be configured to form a part of a foxing strip or other component that will comprise an exposed surface of that component. Step 303 may comprise one or more calendering and/or other mixing operations and/or cutting of sections from a larger sheet or other shape. Steps 301 and/or 303 may also comprise one or more intermediate processing steps. For example, if the matrix material of the sections formed in step 301 or 303 comprises uncured synthetic rubber, a matrix material may be refrigerated after a first set of one more calendering steps, and after refrigeration, additional calendering steps performed. This refrigeration and subsequent calendering may be performed, for example, to eliminate or reduce air bubbles.

In step 305, multiple sections formed in steps 301 and 303 (e.g., the sections 41 and 42; the sections 91, 92, and 93; the sections 111a, 111b, and 112; the sections 141, 142, and 143; the sections 41 and 42a; or the sections 431 and 432) may be positioned into the desired locations relative to one another. For example, one or more of the sections may overlap major edges of one or more others of the sections. The positioned sections may also be placed in a mold element. If multiple components are being formed, multiple combinations of positioned sections may be placed into elements of multiple molds.

In step 307, the mold(s) may be closed around the sections, and heat and pressure may be applied (e.g., via heated press platens). The temperature and heating time may depend on the types of matrix material(s) used. In step 309, the component(s) may be allowed to cool and removed from the mold(s). In step 311, the component(s) may be trimmed. In step 313, the trimmed component(s) may be attached (e.g., using adhesive) to a shoe (e.g., to a sole structure and/or an upper of that shoe). Step 313 may comprise attaching multiple components (e.g., a foxing strip, an ankle patch, a label, and/or other components) comprising embedded particles to the shoe.

Figure 18:
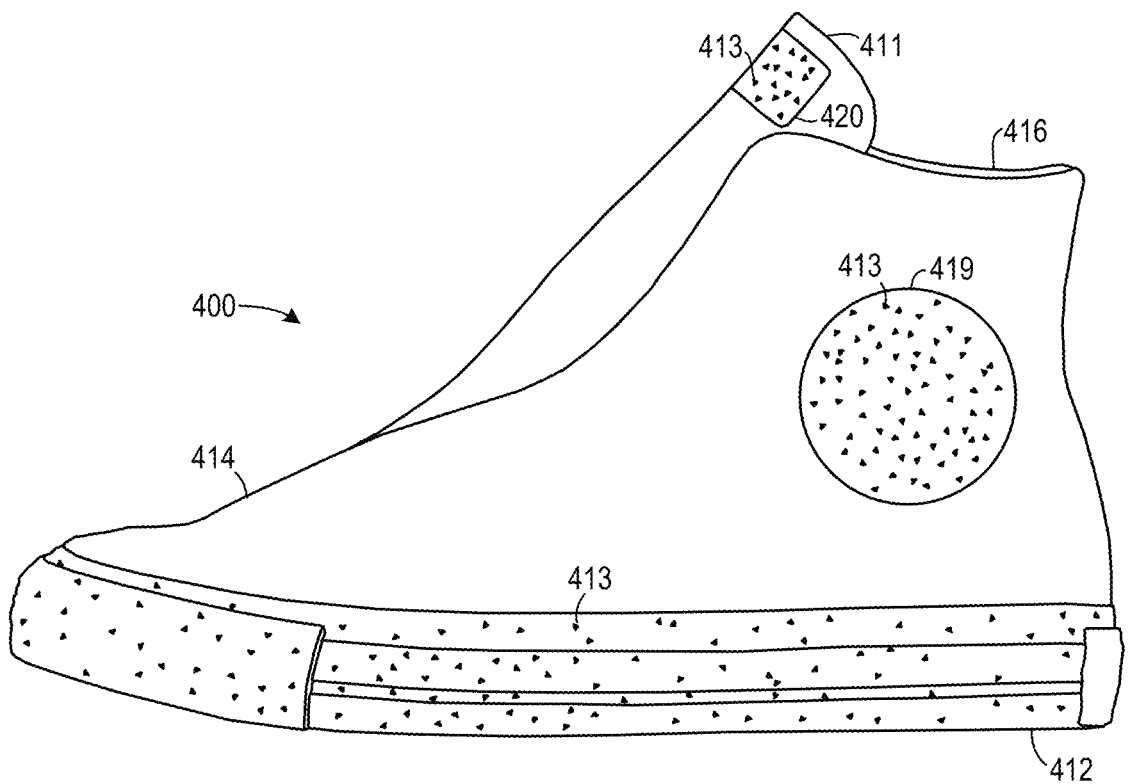
FIG. 18 is lateral side view of another example article of footwear comprising components with embedded particles.

FIG. 18 is a lateral side view of an example shoe 400 that may, except as described below, be similar to the shoe 10. The shoe 400 may include a sole structure, similar to the sole structure 15, attached to a high-top upper 414. A foxing strip 412, similar to the foxing strip 12 or to other foxing strips described above, may completely surround an outer edge of the shoe 400 and cover a connection between the upper 414 and the sole structure. The shoe 400 may additionally include an ankle patch 419 located under an ankle collar 416 and over a lateral malleolus region of the upper 414 that generally corresponds to a location associated with a lateral malleolus of a wearer. A similar ankle patch 419 may also or alternatively be located on a medial side of the upper 414 in a medial malleolus region. A label 420 may be attached to a tongue 411. The patch 419 and/or the label 420 may, similar to the foxing strip 412 and foxing strips described above, comprise a matrix in which particles 413 have been embedded, and may have layers of matrix that lack particles 413. The particles 413 may be any type of particle previously described herein. The particles embedded in the patch 419, in the foxing strip 412, and in the label 420 may all be the same. Alternatively, one or more of the patch 419, the foxing strip 412, and/or the label 420 may comprise a type of particle (or a combination of types of particles) that is different a type of particle (or a combination of types of particles) embedded in one or both of the others of the patch 419, the foxing strip 412, and/or the label 420.

Figure 19:
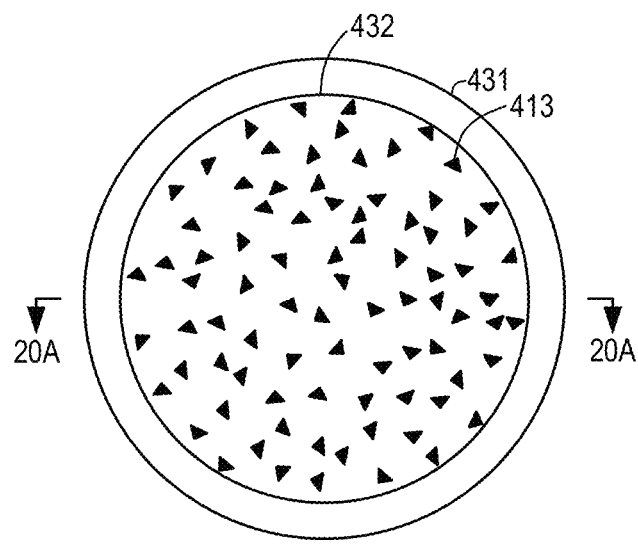
FIG. 19 is a plan view showing arrangement of elastomeric material sections used to form an ankle patch of the article of footwear from FIG. 18.

FIG. 19 is a bottom plan view showing an arrangement of two sections 431 and 432 from which the patch 419 may be formed. The section 431 and the section 432 may, for example, comprise matrix material(s) similar to those described above (e.g., in connection with the sections 41 and 42). The section 431 may lack particles 413. The section 432 may comprise particles 413, which may be embedded in the matrix material of the section 432 in ways similar to those described above (e.g., for the section 41). As can be seen in FIG. 19, the section 431 extends over an outer edge of the section 432.

Figure 20A:
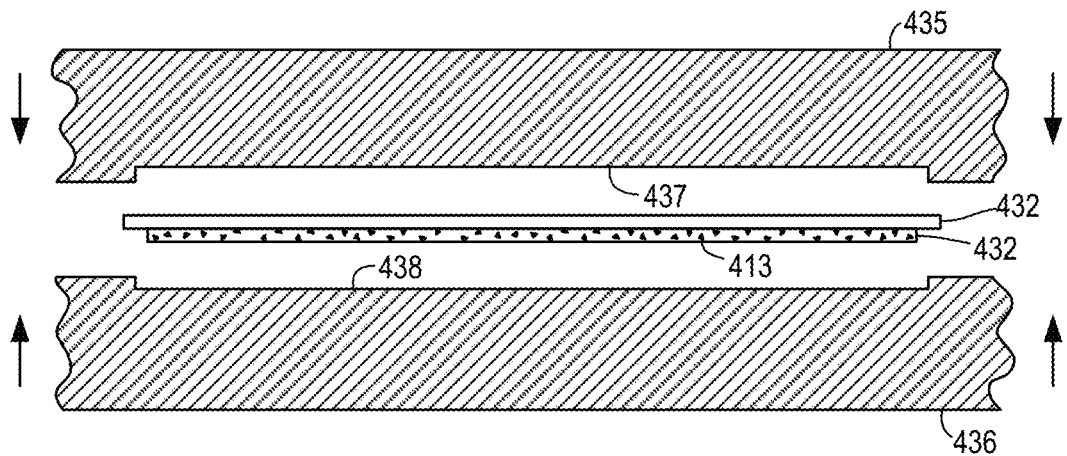
FIG. 20A is a partially schematic area cross-sectional view of the elastomeric material sections of FIG. 19 in a mold for forming the ankle patch of the article of footwear from FIG. 18.

FIG. 20A is a partially schematic area cross-sectional view that shows the elastomeric material sections 431 and 432 from the location indicated in FIG. 19. FIG. 20A further shows elements 435 and 436 of a mold used to form the patch 419. The mold elements 435 and 436 may be similar to other mold elements described herein, but may comprise cavities 437 and 438 that, when the mold elements 435 and 436 are pressed together, form a mold volume corresponding to the shape of the patch 419.

Figure 20B:
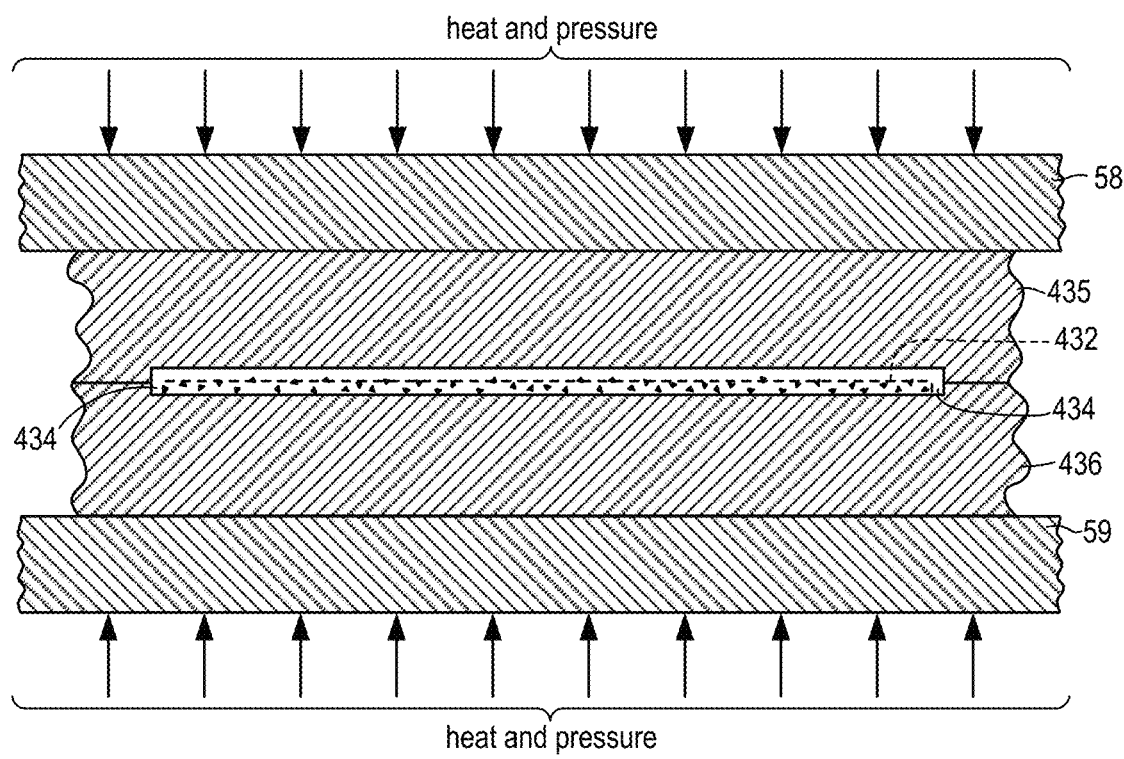
FIG. 20B is a partially schematic area cross-sectional view of the ankle patch, of the article of footwear from FIG. 18, formed by pressing the two elastomeric material sections of FIG. 19 in the mold of FIG. 20A.

FIG. 20B is a partially schematic area cross-sectional view of the patch 419 being formed by pressing the sections 431 and 432 in the cavity of the pressed-together and heated mold elements 435 and 436. During the pressing, the matrix materials of the sections 431 and 432 soften, at least partially flow together, and fuse to form a matrix of the patch 419, with that matrix filling the mold cavity and taking the shape of that cavity. The particles 413 may migrate beyond the original volume of the section 432 shown in broken line. Because of the presence of the section 432, however, the particles 413 are prevented from migration to the surface of the cavity 437, and thus from reaching positions likely to result in protrusion through a surface of the patch 419. The section 431 may also form portion 434, around the outer edge of the patch 419, that may be free of the particles 413.

After the heated pressing, the patch 419 may be allowed to cool and may be removed from the mold elements 435 and 436. The matrix materials of the sections 431 and 432, in addition being fused to one another, may also be cured as a resulted of the heated pressing.

The label 420 may be formed in a process similar to that described above for the patch 419, but using sections (e.g., a section with embedded particles and a section without embedded particles) cut to appropriate shapes (e.g., rectangular shapes of approximately the same shape as the label 420) and mold sections that mate to form a cavity shaped to mold the label 420. The sections used to form the label 420 may be formed from any of the materials described herein (e.g., such as those described for the sections 41 and 42).

The patch 419 and/or the label 420 may comprise any of the material features described herein, e.g., connection with sections of material used to form foxing strips. Any combination of matrix materials and/or particles described above in connection with foxing strips may be used for the sections 431 and 432 and/or for sections used to form the label 420 and/or to form other types of components. One or more additional layers of material may be added (e.g., an additional layer of matrix material without embedded particles, similar to the section 93).

Figure 21:
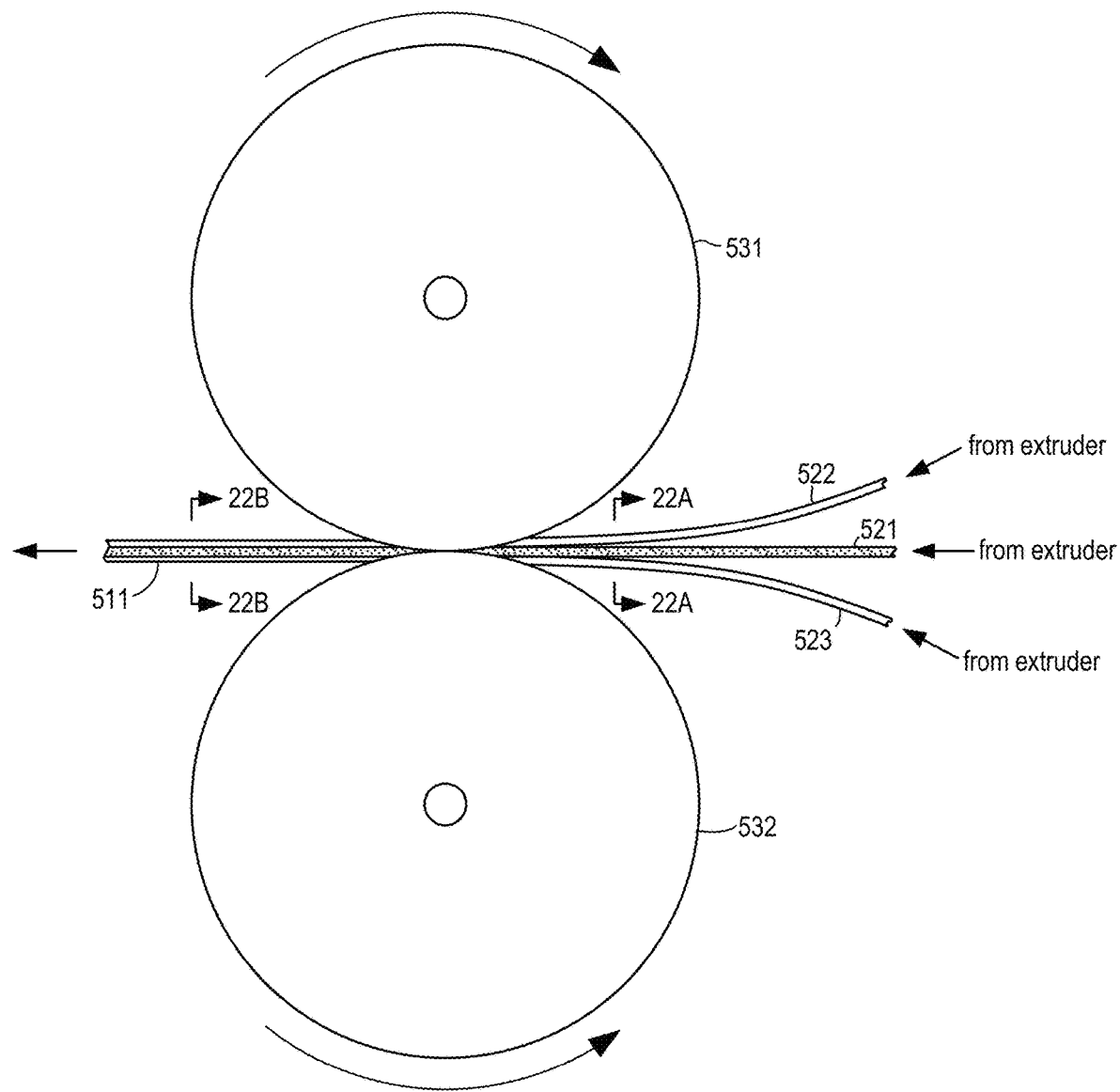
FIG. 21 is a partially schematic side view showing formation of a section using rollers.

FIG. 21 is a partially schematic side view of assembly rollers 531 and 532 and showing formation of an assembled section 511 from sections 521, 522, and 523. The section 511 may be, for example, a single foxing strip or a strip that may be cut into multiple foxing strips. Each of the sections 521, 522, and 523 may comprise strips of materials similar to those described above. The section 521, for example, may comprise an elastomeric material matrix (e.g., such as any of the elastomeric matrix materials described above) in which particles (e.g., such as any of the particles described above) have been embedded. The section 522 may comprise an elastomeric material (e.g., such as any of the elastomeric matrix materials described above) without embedded particles. The section 523 may also comprise an elastomeric material (e.g., such as any of the elastomeric matrix materials described above) without embedded particles. The sections 521, 522, and 523 may be formed by extrusion. The elastomeric material(s) forming each of the sections 521, 522, and 523 may be mixed and/or calendered prior to extrusion. Particles may be embedded in the section 521 by mixing the particles with one or more elastomeric materials (e.g., during one or more calendering steps) prior to extrusion of the section 521. The elastomeric matrix materials of the sections 521, 522, and 523 may be uncured.

The sections 521, 522, and 523 feed into the rollers 531 and 532, which align the sections 521, 522, and 523. The rollers 531 and 532 rotate in the directions indicated in FIG. 21. The sections 521, 522, and 523 are pressed together between the rollers 531 and 532. As a result of the pressing, as well as the tacky nature of the uncured matrix materials of the sections 521, 522, and 523, the sections 521, 522, and 523 form layers of the assembled section 511 that are sufficiently bonded for further handling during manufacturing. After the assembled section 511 is cured (e.g., after being affixed to a shoe), the bonding becomes permanent. Although not shown in FIG. 21, guide bars, rollers, and/or other structures may be included to support and/or guide the sections 521, 522, and 523 as they are fed to the rollers 531 and 532. Also or alternatively, the sections 521, 522, and 523 could be manually and/or otherwise prepositioned in contact with one another, in desired relative positions, prior to being fed into the rollers 531 and 532. Inherent tackiness of uncured matrix materials may then keep such prepositioned sections 521, 522, and 523 in the desired relative positions prior to entering the rollers 531 and 532. Guide bars, rollers, and/or other structures may be included to support and/or guide the assembled section 511 as it emerges from the rollers 531 and 532.

Figure 22A:
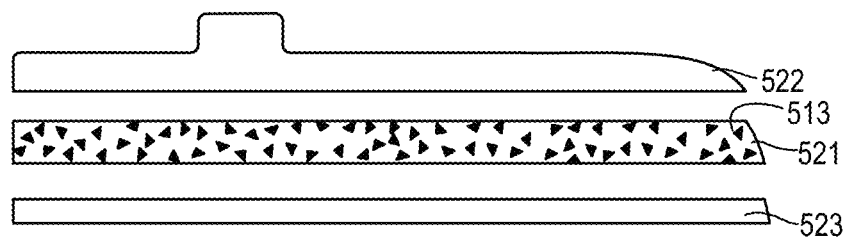
FIGS. 22A and 22B are area cross-sectional views from the locations indicated in FIG. 21.
Figure 22B:
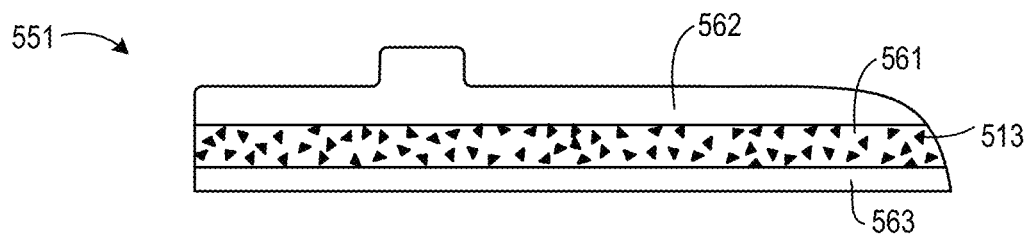

FIG. 22A is an area cross-sectional view, from a first location indicated in FIG. 21, that shows the sections 521, 522, and 523 prior to entering the rollers 531 and 532. As indicated above, the section 521 may comprise embedded particles 513. The sections 522 and 523 may lack embedded particles. FIG. 22B is an area cross-sectional view, from a second location indicated in FIG. 21, showing the assembled section 511. Similar to sections formed by molding, the assembled section 511 includes layers 562 and 563 in which particles are absent, as well as a layer 561 that comprises embedded particles 513.

Figure 23A:
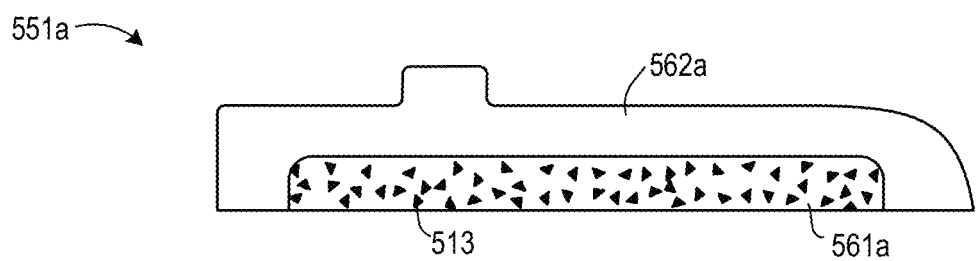
FIGS. 23A, 23B, and 23C are partially schematic area cross sectional views of additional examples of foxing strips.
Figure 23B:
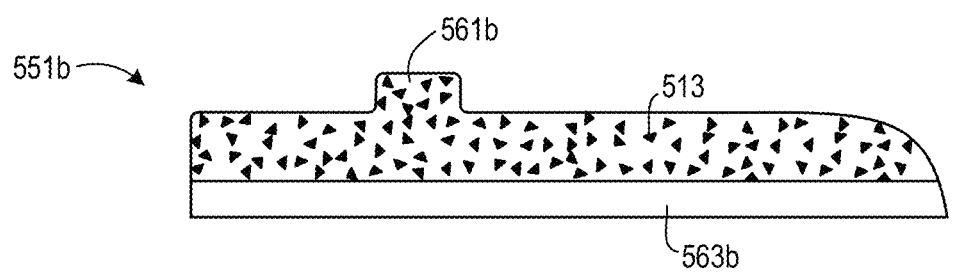
Figure 23C:
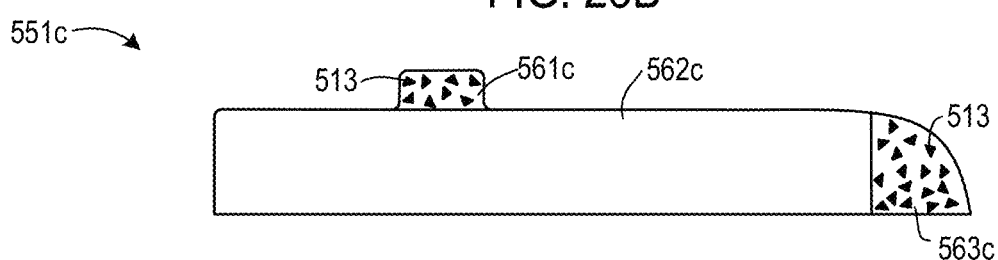

Some or all sections used to create an assembled section (e.g., any of the sections 521, 522, and/or 523) may comprise embedded particles, and/or an assembled section may be formed from more or fewer sections and/or from sections having different shapes. FIGS. 23A through 23C are area cross-sectional views, from locations similar to that indicated in FIG. 21 for FIG. 22B, showing additional examples of assembled sections that may be formed using the process shown in FIG. 21. Assembled section 551*a* shown in FIG. 23A may be formed by omitting the section 523, and by increasing the thickness of the section 521. The section 551*a* includes a layer 562*a* (similar to the layer 562) that lacks particles 513, and a layer 561*a* (similar to the layer 5561) that comprises particles 513. Assembled section 551*b* shown in FIG. 23B may be formed by eliminating the section 522, and by increasing the thickness and width of the section 521. The section 551*b* includes a layer 561*b* (similar to the layer 561) that comprises particles 513, and a layer 563*b* (similar to the layer 563) that lacks particles. As shown in FIG. 23C, a first section with embedded particles 513, a second section without embedded particles, and a third section with embedded particles 513 may be combined between rollers create an assembled section 551*c* that comprises layers 561*c* (comprising particles 513), 562*c* (lacking particles 513), and 563*c* (comprising particles 513).

The examples of FIGS. 22A through 23C are not limiting. Other configurations of sections may be formed by modifying the number, shapes, and/or materials of sections fed to assembly rollers, and/or by modifying the shape of one or more extrusion dies and/or of one or more rollers. Other types of components may be formed using an extrusion process similar to that described above. For example, ankle patches and/or labels may be stamped from an extruded section similar to the section 511.

Figure 24:
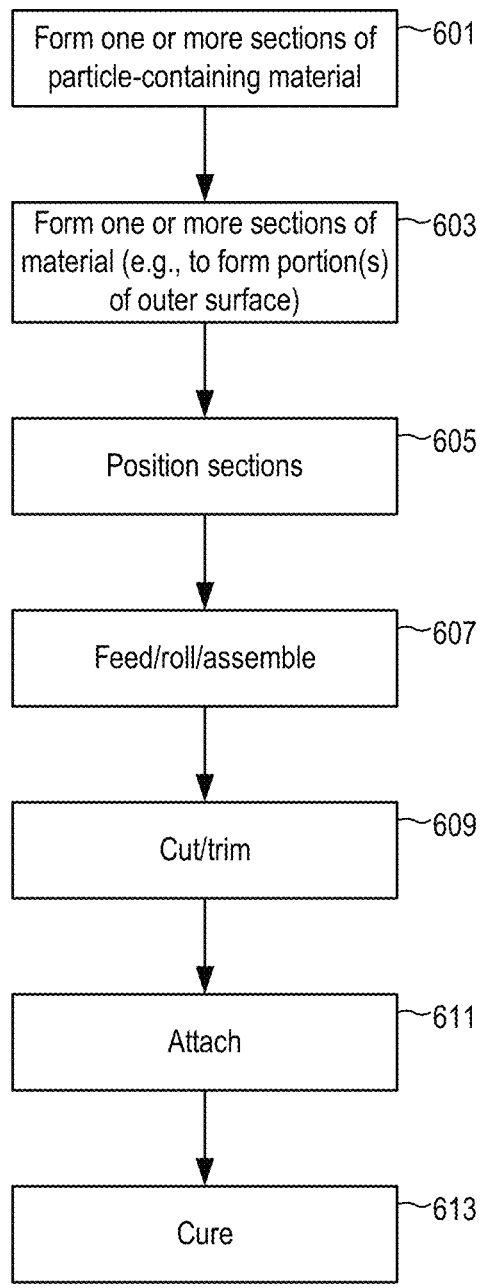
FIG. 24 is a flowchart showing steps of another example method for fabricating a foxing strip and/or other component(s) and affixing the component(s) to a shoe.

FIG. 24 is a flowchart showing steps of an example method for fabricating a component (e.g., a foxing strip and/or other component (e.g., an ankle patch and/or label such as are described below)) and affixing that component to a shoe. The order of some steps may be rearranged. Some steps may be omitted and/or other steps may be added. In step 601, one or more sections of a particle-containing material (e.g., the section 521) may be formed. Step 601 may comprise operations similar to those described above. In step 603, one or more additional sections (e.g., one or more of the sections 522 and 523) may be formed. The section(s) formed in step 603 may lack particles of the type mixed with a matrix material in step 601, and/or may otherwise be configured to form a part of a component that will comprise an exposed surface of that component. Step 603 may comprise operations similar to those described above. Steps 601 and/or 603 may also comprise one or more intermediate processing steps.

In step 605, multiple sections formed in steps 601 and 603 may be positioned into desired locations relative to one another. For example, one or more of the sections may overlap major edges of one or more others of the sections. In step 607, the positioned sections may be fed into formed between two rollers (e.g., between the rollers 531 and 532), to form an assembled section (e.g., the assembled section 511). In step 609, a footwear component (e.g., a foxing strip, ankle patch, or label) may be obtained from the extruded section.

In step 611, the obtained component may be attached to other components (e.g., a sole structure and/or an upper) of a shoe. Step 611 may comprise affixing other obtained components (e.g., components obtained from different extruded sections) to the other shoe components. In step 611, tackiness of uncured materials in obtained component(s) may be used to hold the obtained component(s) in place relative to the other shoe components. Also or alternatively, additional adhesive may be used. In step 613, the obtained component(s) may be cured. Step 613 may comprise placing a shoe comprising attached obtained component(s) into a chamber filled with a curing gas maintained at a curing temperature and/or pressure for a cure duration. After curing in step 613, materials of the obtained component(s) may be permanently bonded to one another, and the obtained component(s) may be permanently bonded to other components of the shoe.

The methods described herein may also be used to form shoe components other than foxing strips, ankle patches, and/or labels, as well as to form parts of other types of apparel (e.g., pants, coats, gloves) and/or other types of wearable articles (e.g., shin guards, elbow pads, sports helmets, etc.). As used herein, the term "substantially" means mostly, or almost the same as, within the constraints of sensible commercial engineering objectives, costs, manufacturing tolerances, and capabilities in the field of manufacturing the article being formed. The term "approximately" means close to, or about, a particular value, within the constraints of sensible commercial engineering objectives, costs, manufacturing tolerances, and capabilities in the field of manufacturing the article being formed.

The foregoing has been presented for purposes of illustration and description. The foregoing is not intended to be exhaustive or to limit the present disclosure to the precise examples given, and modifications and variations are possible in light of the above. The examples provided herein were chosen and described in order to explain the principles and the nature of various features and their practical application to enable one skilled in the art to utilize the present disclosure, including use with various modifications as are suited to the particular use contemplated. Any and all combinations, subcombinations and permutations of features from herein-described examples are the within the scope of the disclosure.

For the avoidance of doubt, the present application includes the subject-matter described in the following numbered clauses:

1. A method comprising positioning at least a first section of a first material and a second section of a second material in a mold.
2. The method of clause 1, wherein the first material is a first elastomeric material and/or the second material is a second elastomeric material.
3. The method of any of clauses 1-2, wherein the first section comprises embedded particles of a third material different from the second elastomeric material.
4. The method of any of clauses 1-3, wherein the second section covers the first section and extends past at least one edge of the first section.
5. The method of any of clause 1-4, further comprising compressing the first and second sections in the mold, while applying heat to the compressed first and second sections, to form a single molded section.
6. The method of any of clauses 1-5, wherein the embedded particles comprise glitter.
7. The method of any of clauses 1-6, wherein second section lacks particles of the third material.
8. The method of any of clauses 1-7, wherein the second elastomeric material is clear (e.g., transparent and untinted), transparent and tinted, translucent and untinted, translucent and tinted, opaque, or opaque and tinted.
9. The method of any of clauses 1-8, wherein the first elastomeric material is clear (e.g., transparent and untinted), transparent and tinted, translucent and untinted, translucent and tinted, opaque, or opaque and tinted.
10. The method of any of clauses 1-9, further comprising attaching, as a foxing, at least a portion of the single molded section to an article of footwear.
11. The method of clause 10, wherein the attaching comprises attaching the at least a portion of the single molded section to one or more of a medial side heel portion of a sole structure of the article of footwear, a toe portion of the sole structure, or a lateral side heel portion of the sole structure.
12. The method of any of clauses 1-11, wherein the compressing comprises at least partially fusing the first and second sections.
13. The method of any of clauses 1-12, wherein the compressing comprises causing portions of the second section to flow over and bond to first and second edges of the first section.
14. The method of any of clauses 1-13, further comprising: applying the particles of the third material to a block of the first elastomeric material; calendering the block with the applied particles until the particles are distributed within the first elastomeric material of the block; and cutting the first section from the calendered block.

15. A method comprising positioning a first section of a first material adjacent to a second section of a second material.
16. The method of clause 15, wherein the first material is a first elastomeric material and/or the second material is a second elastomeric material.
17. The method of any of clauses 15-16, the first section has first major edges and first minor edges and comprises embedded particles of a third material different from the second elastomeric material
18. The method of any of clauses 15-17, wherein the second section, after the positioning, overlaps the first section along at least portions of the first major edges.
19. The method of any of clauses 15-18, further comprising compressing and heating the first section and the second section in a mold to form a single molded section.
20. The method of any of clauses 15-19, wherein the mold comprises a footwear foxing mold.
21. The method of any of clauses 15-20, further comprising attaching, as a foxing, at least a portion of the single molded section to an article of footwear.
22. The method of any of clauses 15-21, wherein second section lacks particles of the third material.
23. The method of any of clauses 15-22, wherein the first elastomeric material is clear (e.g., transparent and untinted), transparent and tinted, translucent and untinted, translucent and tinted, opaque, or opaque and tinted; wherein the second elastomeric material is clear (e.g., transparent and untinted), transparent and tinted, translucent and untinted, translucent and tinted, opaque, or opaque and tinted; and wherein the embedded particles optionally comprise glitter particles.
24. The method of any of clauses 15-23, wherein the compressing and heating comprise at least partially fusing the first and second sections.
25. The method of any of clauses 15-24, wherein the compressing and heating comprise causing portions of the second section to flow over and bond to the first section along the first major edges.
26. An article comprising: a sole structure; an upper attached to the sole structure; and a foxing strip, surrounding an outer edge of the sole structure, and comprising an inner zone, an outer zone, a bottom zone, and a top zone.
27. The article of clause 26, wherein the foxing strip is elastomeric.
28. The article of any of clauses 26-27, wherein the inner zone is disposed between the outer zone and the sole structure and comprises a bottom edge and a top edge.
29. The article of any of clauses 26-28, the bottom edge is proximate to an exposed outsole surface of the sole structure.
30. The article of any of clauses 26-29, wherein the top edge is displaced from the bottom edge and toward the upper.
31. The article of any of clauses 26-30, wherein the bottom zone covers the bottom edge and the top zone covers the top edge.
32. The article of any of clauses 26-31, wherein particles of a third material, different from one or more elastomeric materials forming the foxing strip, are distributed throughout the inner zone.
33. The article of any of clauses 26-32, wherein the outer, bottom, and top zones are substantially free of the third material.
34. The article of any of clauses 26-33, wherein the inner zone and the outer zone are at least partially fused together.
35. The article of any of clauses 26-34, wherein the particles comprise glitter.
36. The article of any of clauses 26-35, wherein the foxing strip extends along one or more of a medial side heel portion of the sole structure, a medial side midfoot portion of the sole structure, a medial side forefoot portion of the sole structure, a toe portion of the sole structure, a lateral side forefoot portion of the sole structure, a lateral side midfoot portion of the sole structure, or a lateral side heel portion of the sole structure.
37. The article of any of clauses 26-36, wherein the foxing strip extends continuously from a medial side heel portion of the sole structure, around a toe portion of the sole structure, and to a lateral side heel portion of the sole structure.
38. A method comprising feeding sections comprising at least a first section comprising a first material and a second section comprising a second material between rollers.
39. The method of clause 38, wherein one or more of the sections are formed by extrusion.
40. The method of any of clauses 38-39, wherein the first material is a first elastomeric material and the second material is a second elastomeric material.
41. The method of any of clauses 38-40, wherein the first section comprises embedded particles of a third material different from the second elastomeric material.
42. The method of any of clauses 38-42, wherein the second section covers the first section and extends past at least one edge of the first section.
43. The method of any of clauses 38-42, wherein the sections comprise a third section of a fourth material.
44. The method of any of clauses 38-43, wherein one or more of the first material, the second material, and the fourth material are the same.
45. The method of any of clauses 38-44, further comprising pressing the sections between the rollers to form an assembled section.
46. The method of any of clauses 38-45, further comprising obtaining a footwear component from the assembled section.
47. The method of clause 46, wherein obtaining the footwear component comprises cutting the footwear component from the assembled section.
48. The method of any of clauses 46-47, wherein the footwear component comprises a foxing strip, an ankle patch, or a label.
49. The method of any of clauses 46-48, further comprising attaching the footwear component to at least one of a shoe sole structure or a shoe upper.
50. The method of any of clauses 46-49, further comprising curing the footwear component.

The invention claimed is:
1. A method comprising:
positioning a first section of a first elastomeric material and a second section of a second elastomeric material in a mold, wherein:
the first section comprises embedded particles of a third material different from the second elastomeric material, wherein the first section includes a first outer perimeter edge having a first outer perimeter edge face and a second outer perimeter edge having a second outer perimeter edge face, and the second section covers the first section and extends past the first outer perimeter edge and the second outer perimeter edge of the first section; and compressing the first and second sections in the mold, while applying heat to the compressed first and second sections, to form a single molded section, wherein the compressing while applying heat comprises causing portions of the second section to flow over, cover, and bond to the first outer perimeter edge face and the second outer perimeter edge face of the first section.

2. The method of claim 1, wherein the embedded particles comprise glitter.

3. The method of claim 1, wherein the second elastomeric material is transparent.

4. The method of claim 1, wherein the first elastomeric material is transparent.

5. The method of claim 1, further comprising:
attaching, as a foxing, at least a portion of the single molded section to an article of footwear.

6. The method of claim 5, wherein the attaching comprises attaching the at least a portion of the single molded section to one or more of a medial side heel portion of a sole structure of the article of footwear, a toe portion of the sole structure, or a lateral side heel portion of the sole structure.

7. The method of claim 1, wherein the compressing comprises at least partially fusing the first and second sections.

8. The method of claim 1, wherein after positioning the first section and the second section such that the second section covers the first section and extends past the first outer perimeter edge and the second outer perimeter edge of the first section, the method comprises closing the mold.

9. The method of claim 1, further comprising:
applying the particles of the third material to a block of the first elastomeric material;
calendering the block with the applied particles until the particles are distributed within the first elastomeric material of the block; and
cutting the first section from the calendered block.

10. The method of claim 1, wherein:
the positioning comprises positioning the first section, the second section, and a third section of a third elastomeric material in the mold,
the third section is positioned between the first section and the second section, and
the third section comprises embedded particles of a fourth material different from the third elastomeric material and different from the third material.

11. The method of claim 1, wherein the second section comprises embedded particles of a fourth material different from the second elastomeric material and different from the third material.

12. The method of claim 1, wherein the first outer perimeter edge and the second outer perimeter edge of the first section are major edges, wherein the first section further includes a first minor outer perimeter edge and a second minor outer perimeter edge, and wherein the second section, after the positioning, overlaps the first section along and extends past at least portions of the first outer perimeter edge and the second outer perimeter edge.

13. The method of claim 1, wherein the mold comprises a footwear foxing mold.

14. The method of claim 1, wherein the first elastomeric material and the second elastomeric material are either transparent or translucent, and wherein the embedded particles comprise glitter particles.

15. The method of claim 1, wherein the compressing while applying heat forms the single molded section to include: (i) the second section extending across and covering all of the first outer perimeter edge face to form a bottom surface of the single molded section and (ii) the second section extending across and covering all of the second outer perimeter edge face to form a top surface of the single molded section.

16. A method comprising:
positioning a first section of a first elastomeric material adjacent to a second section of a second elastomeric material, wherein:
the first section has: (a) a first major outer perimeter edge having a first major outer perimeter edge face, (b) a second major outer perimeter edge having a second major outer perimeter edge face, (c) a first minor outer perimeter edge, and (d) a second minor outer perimeter edge, and comprises embedded particles of a third material different from the second elastomeric material, and
the second section, after the positioning, overlaps the first section along at least portions of the first major outer perimeter edge and the second major outer perimeter edge; and
compressing, while heating, the first section and the second section in a mold to form a single molded section, wherein the compressing and heating comprise causing portions of the second section to flow over, cover, and bond to the first section along the first major outer perimeter edge face and the second major outer perimeter edge face.

17. The method of claim 16, wherein the mold comprises a footwear foxing mold.

18. The method of claim 16, further comprising:
attaching, as a foxing, at least a portion of the single molded section to an article of footwear.

19. The method of claim 16, wherein the first elastomeric material and the second elastomeric material are either transparent or translucent, and wherein the embedded particles comprise glitter particles.

20. The method of claim 16, wherein the compressing and heating comprise at least partially fusing the first and second sections.

21. The method of claim 16, wherein after positioning the first section and the second section such that the second section overlaps the first section along at least portions of the first major outer perimeter edge and the second major outer perimeter edge, the method further comprises closing the mold.

22. The method of claim 16, wherein the compressing while heating forms the single molded section to include: (i) the second section extending across and covering all of the first major outer perimeter edge face to form a bottom surface of the single molded section and (ii) the second section extending across and covering all of the second major outer perimeter edge face to form a top surface of the single molded section.

* * * * *